United States Patent
Goff et al.

(10) Patent No.: US 11,808,310 B2
(45) Date of Patent: Nov. 7, 2023

(54) TRANSMISSION ASSEMBLY FOR TRANSMITTING TORQUE ACROSS AN ANGULAR CONNECTION BETWEEN A TORSIONAL DRIVE COMPONENT AND A TORSIONALLY DRIVEN COMPONENT

(71) Applicant: New Ventures Marketing, LLC, Casper, WY (US)

(72) Inventors: Gregory Clarence Goff, Bar Nunn, WY (US); Patrick Daniel Gallagher, Mills, WY (US); Daniel Robert Gallagher, Casper, WY (US); Krista D. Anderson, Evansville, WY (US)

(73) Assignee: New Ventures Marketing, LLC, Casper, WY (US)

( * ) Notice: Subject to any disclaimer, the term of this patent is extended or adjusted under 35 U.S.C. 154(b) by 145 days.

(21) Appl. No.: 17/465,471

(22) Filed: Sep. 2, 2021

(65) Prior Publication Data

US 2021/0396274 A1 Dec. 23, 2021

Related U.S. Application Data

(60) Division of application No. 16/384,389, filed on Apr. 15, 2019, now Pat. No. 11,137,033, which is a
(Continued)

(51) Int. Cl.
*F16D 3/18* (2006.01)
*E21B 4/02* (2006.01)
(Continued)

(52) U.S. Cl.
CPC ............... *F16D 3/185* (2013.01); *E21B 4/02* (2013.01); *E21B 17/03* (2013.01); *F16C 1/08* (2013.01); *E21B 7/067* (2013.01)

(58) Field of Classification Search
CPC . F16D 3/185; E21B 4/02; E21B 17/03; E21B 7/067; F16C 1/08
(Continued)

(56) References Cited

U.S. PATENT DOCUMENTS 1,511,390 A * 10/1924 Bethel .................... F16D 3/56
2,402,238 A   6/1946 Carpenter
(Continued)

FOREIGN PATENT DOCUMENTS

FR         2259286        8/1975

*Primary Examiner* — Greg Binda
(74) *Attorney, Agent, or Firm* — James A. Sheridan; Sheridan Law, LLC

(57) ABSTRACT

A transmission assembly includes a cavity in a female U-joint having a groove that extends radially outward from an inner diameter thereof and bounded by three planar drive surfaces. A male U-joint member includes a drive end includes a longitudinal rectangular extension protruding radially outward from a periphery and positioned within the groove of the cavity. The drive end includes a longitudinal rectangular insert has a portion forming the extension positioned within the groove and retained within the drive end. The extension includes (1) opposing longitudinal sides, each forming a side crest disposed between a pair of angular side surfaces that extend axially from the side crest inward toward a center of the extension, and (2) a top side forming a top crest disposed between a pair of angular top surfaces that extend axially from the top crest downward toward the center of the extension.

4 Claims, 24 Drawing Sheets

Related U.S. Application Data continuation-in-part of application No. 16/166,819, filed on Oct. 22, 2018, now Pat. No. 11,092,199.

(51) Int. Cl.
*E21B 17/03* (2006.01)
*F16C 1/08* (2006.01)
*E21B 7/06* (2006.01)

(58) Field of Classification Search
USPC .......................................................... 464/152
See application file for complete search history.

(56) References Cited

U.S. PATENT DOCUMENTS

| | | |
|---|---|---|
| 2,744,449 A | 5/1956 | Belden et al. |
| 4,968,292 A | 11/1990 | Takeda |
| 5,267,905 A | 12/1993 | Wenzel et al. |
| 5,704,838 A | 1/1998 | Teale |
| 10,900,287 B2 | 1/2021 | Wheeler et al. |
| 2016/0108970 A1 | 4/2016 | Baudoin |

* cited by examiner

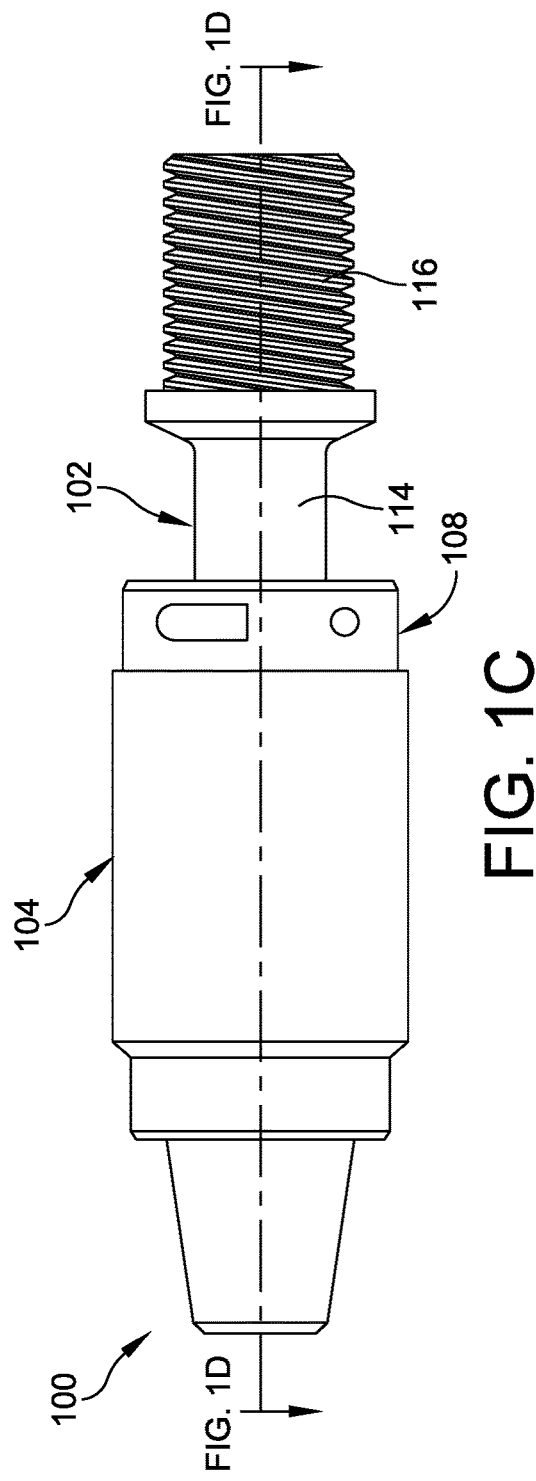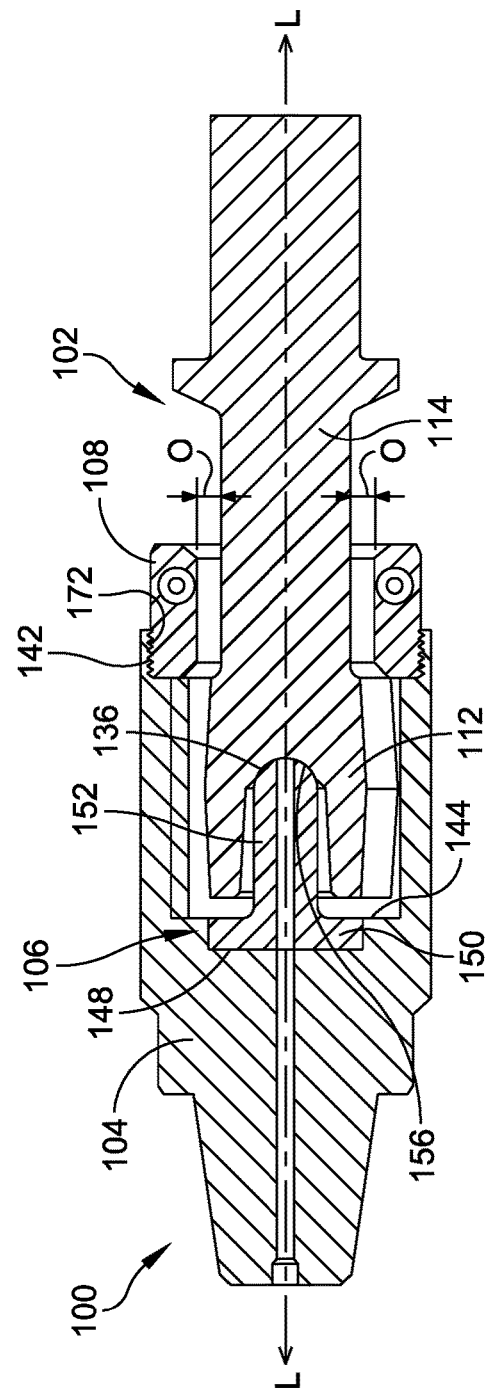

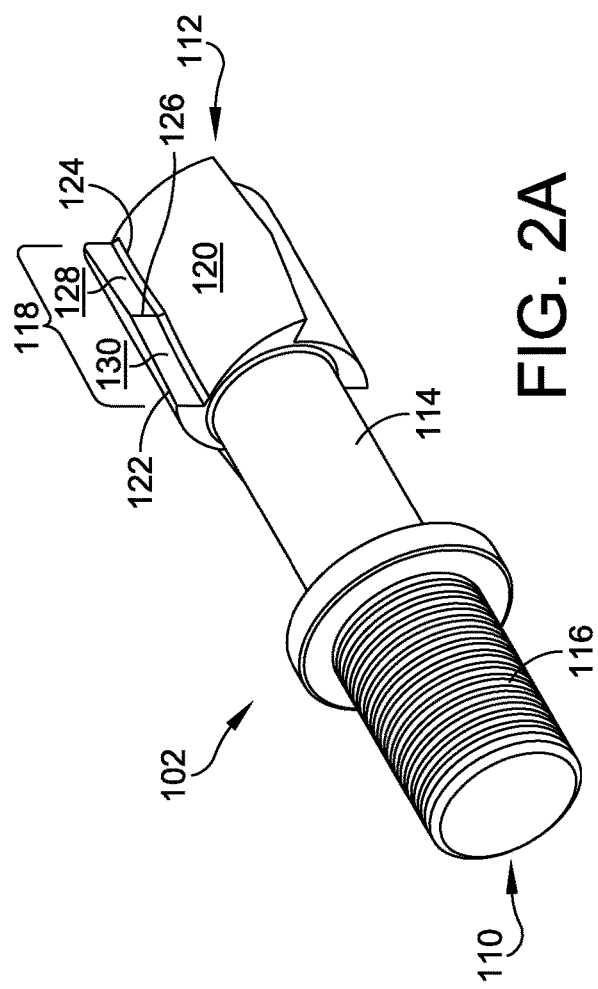
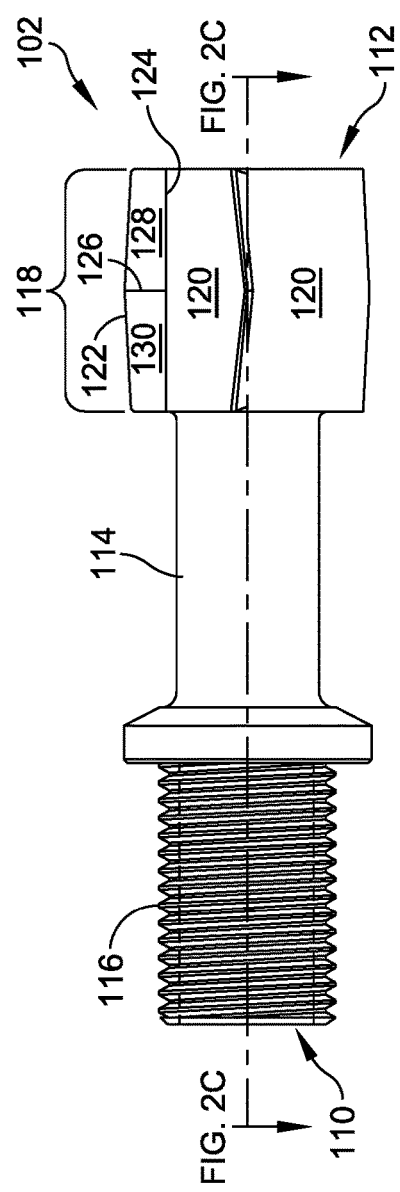
FIG. 2A
FIG. 2B

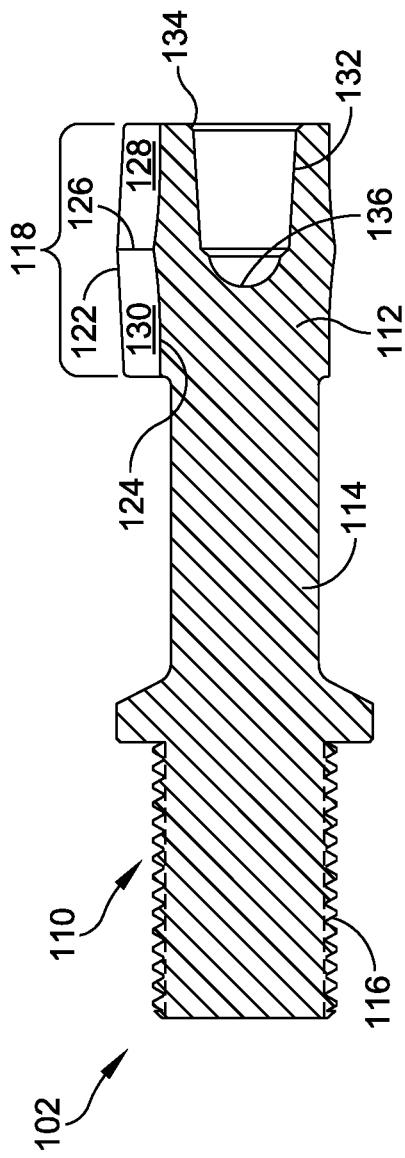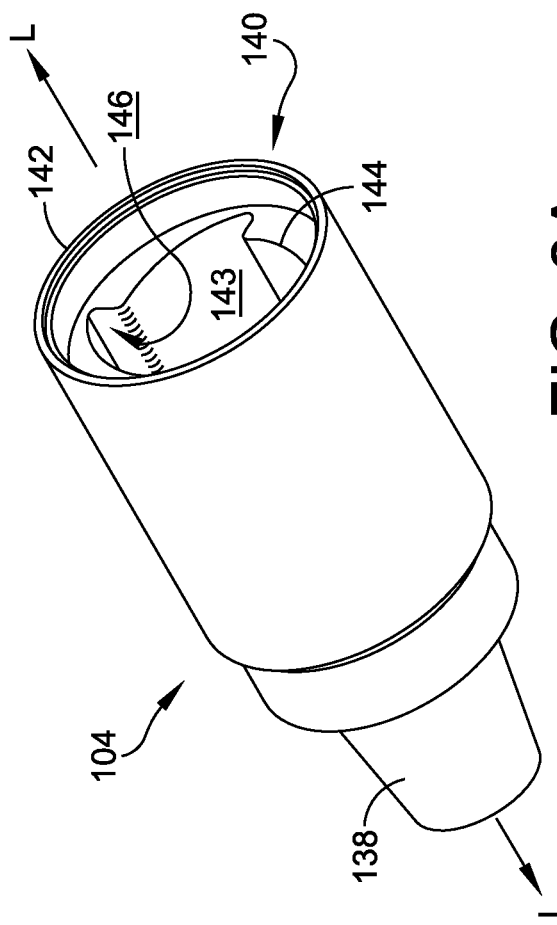

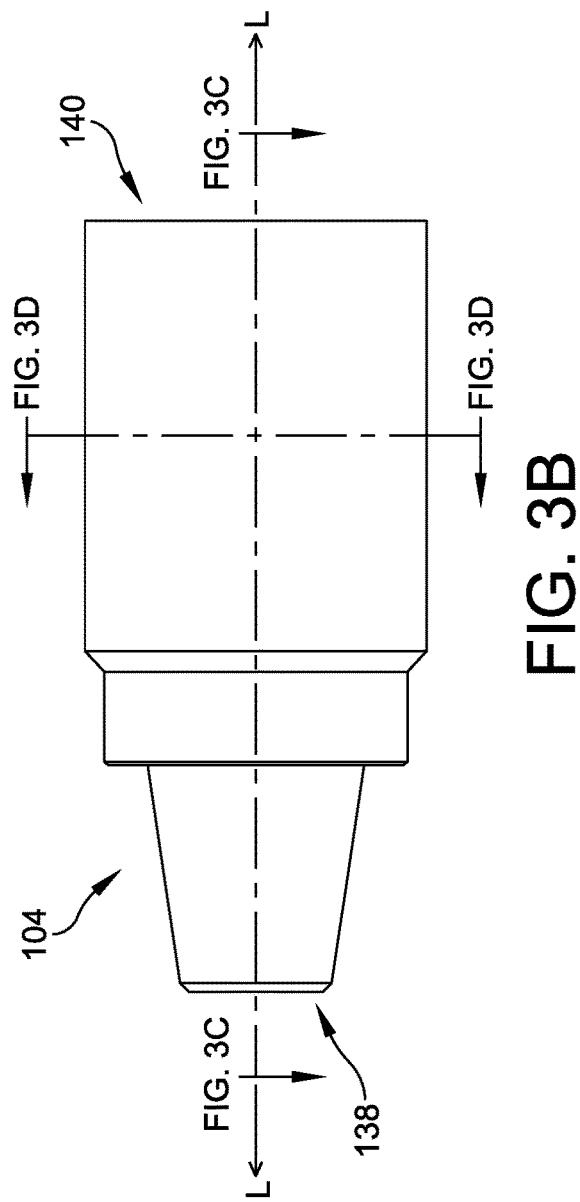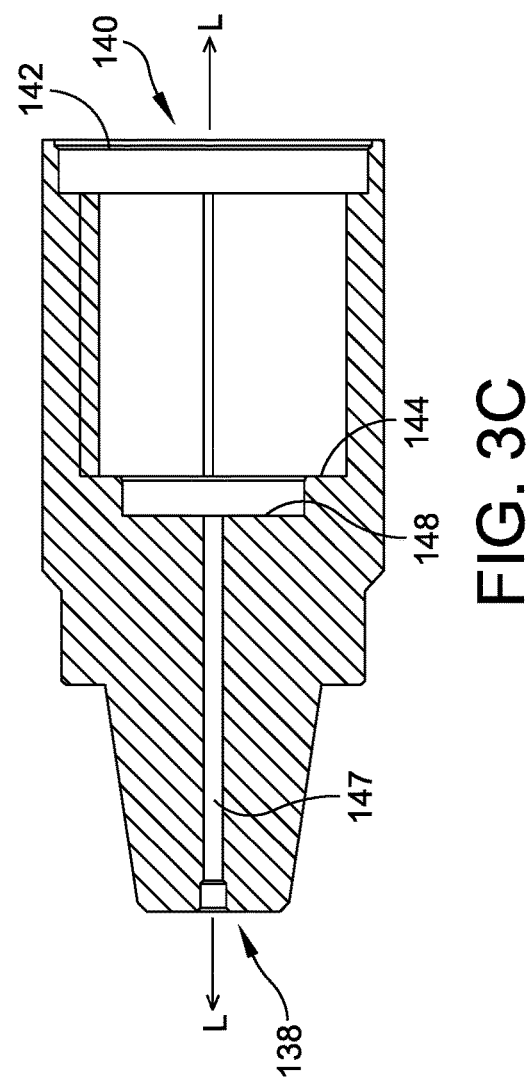
FIG. 3B
FIG. 3C

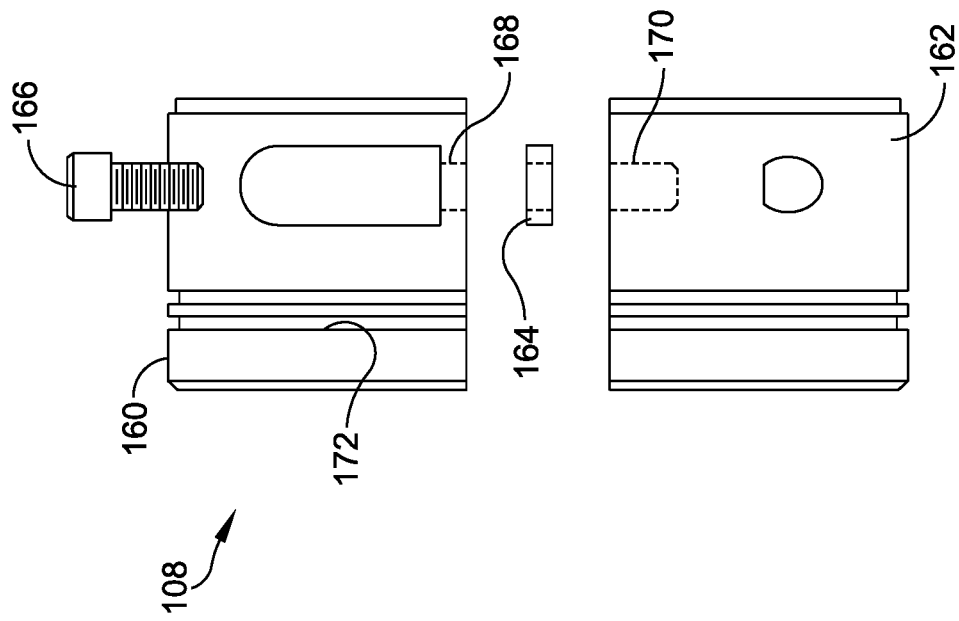

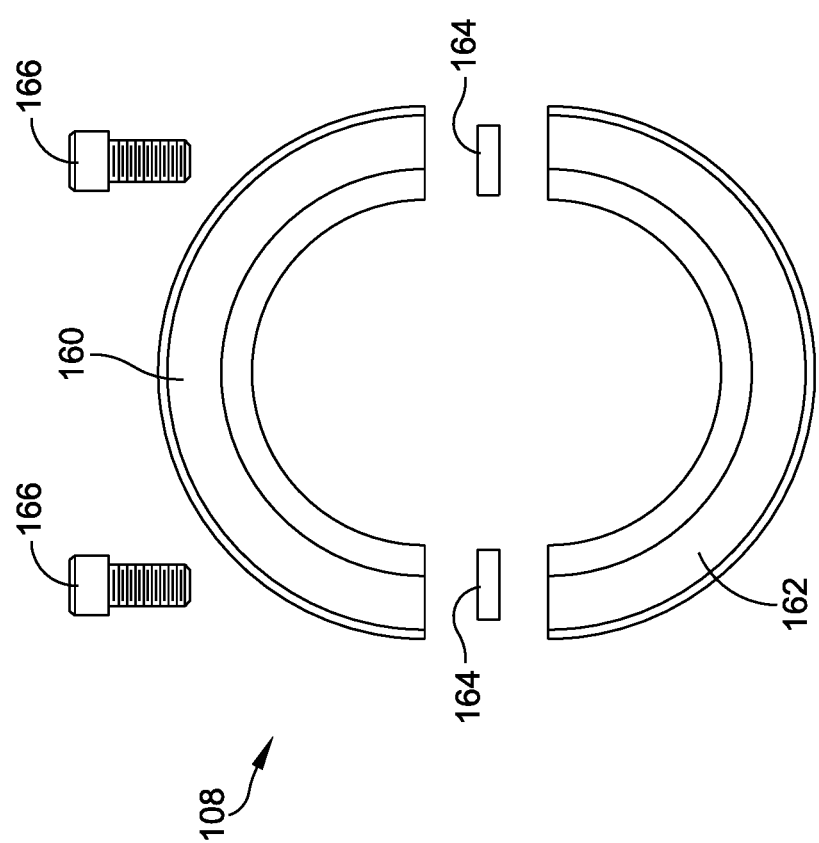

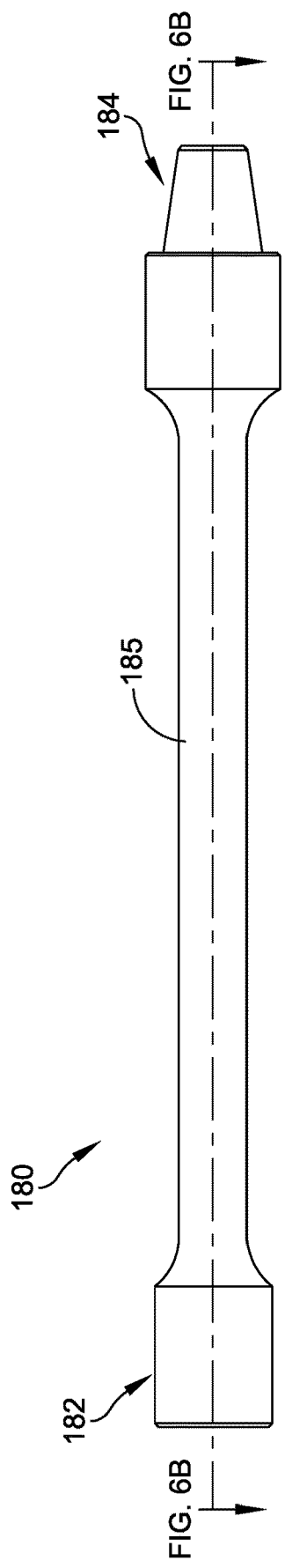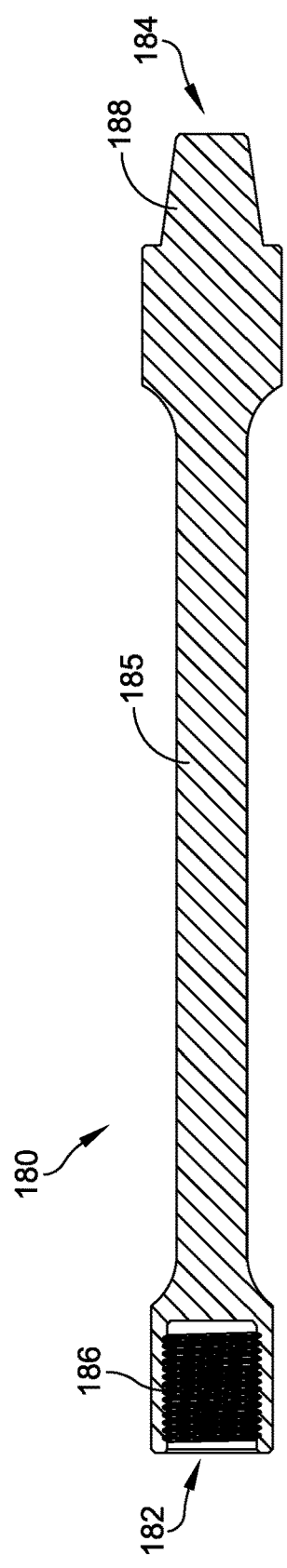

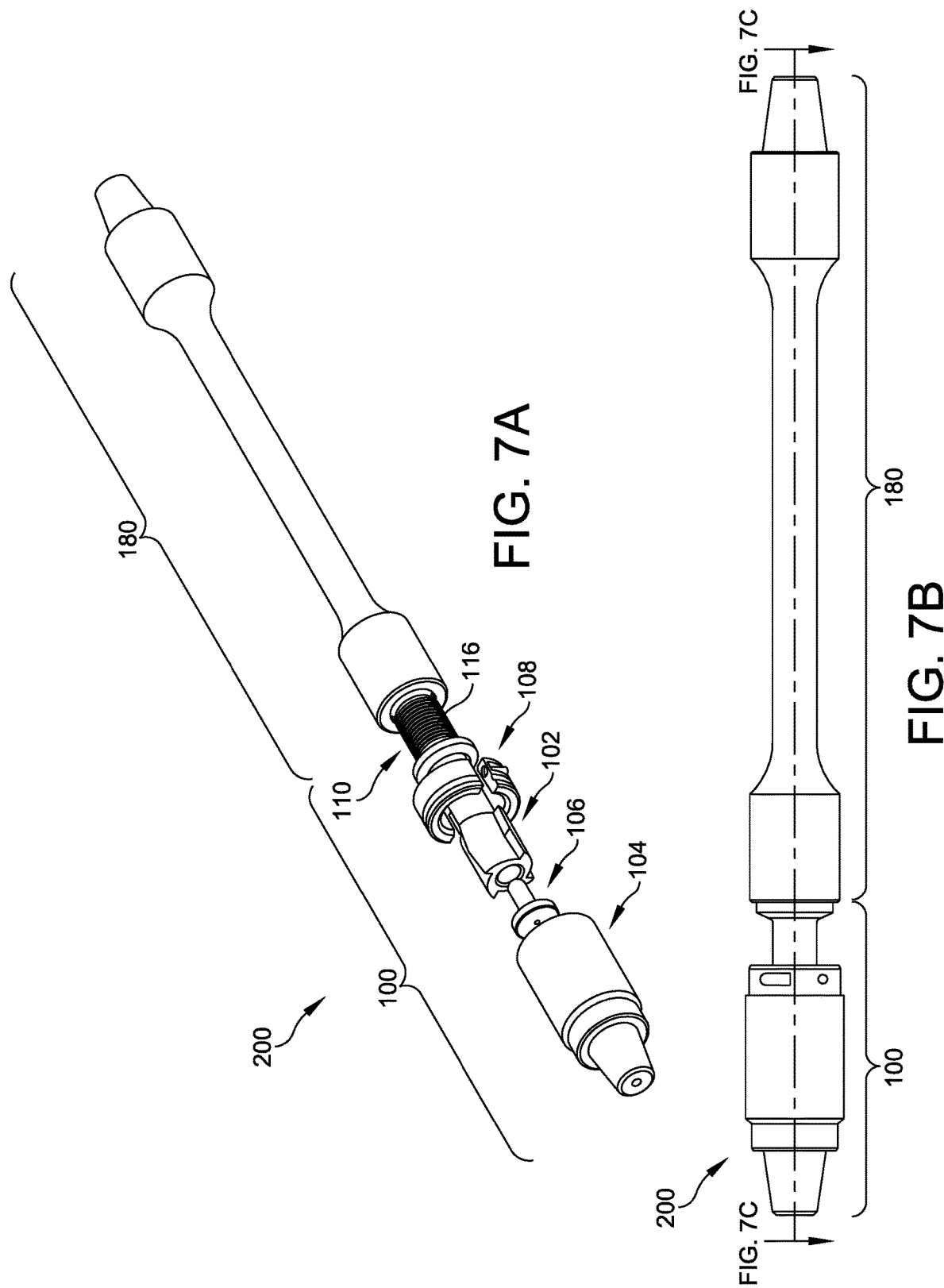

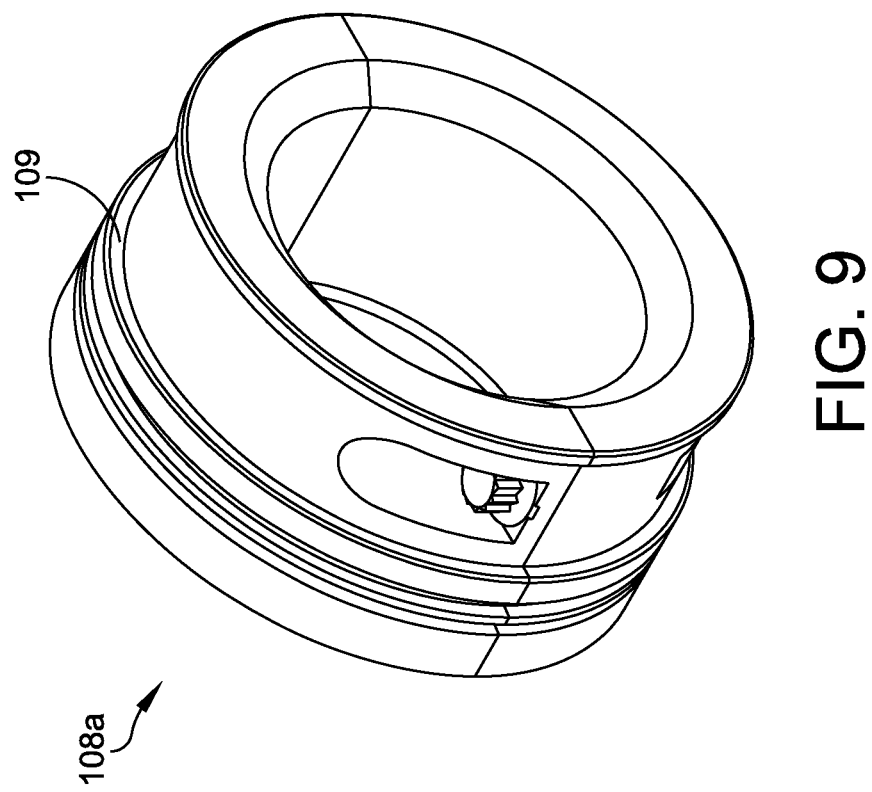

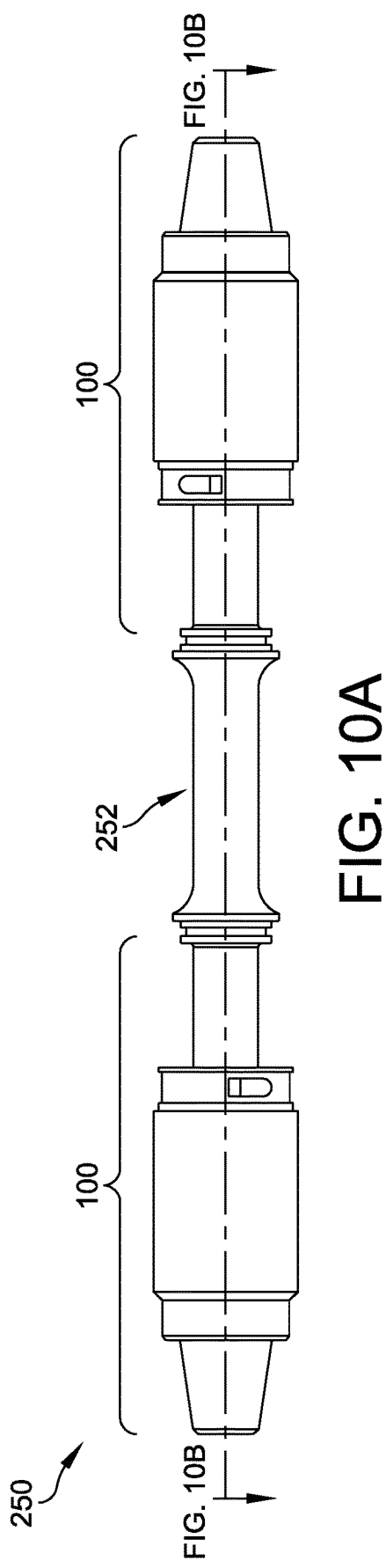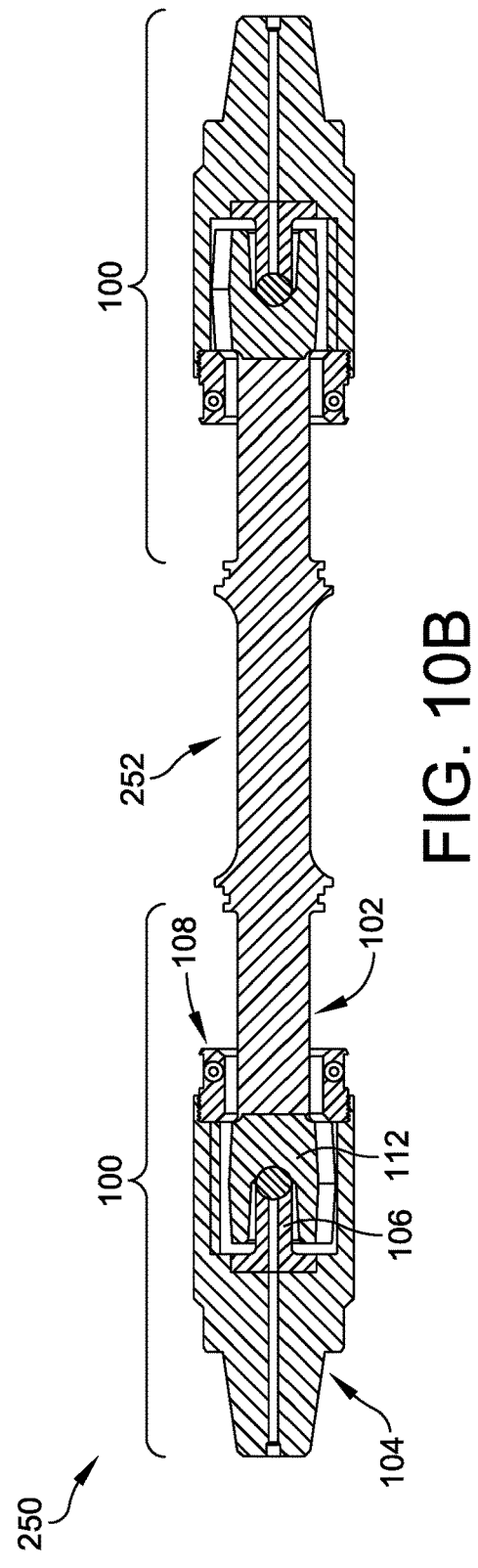

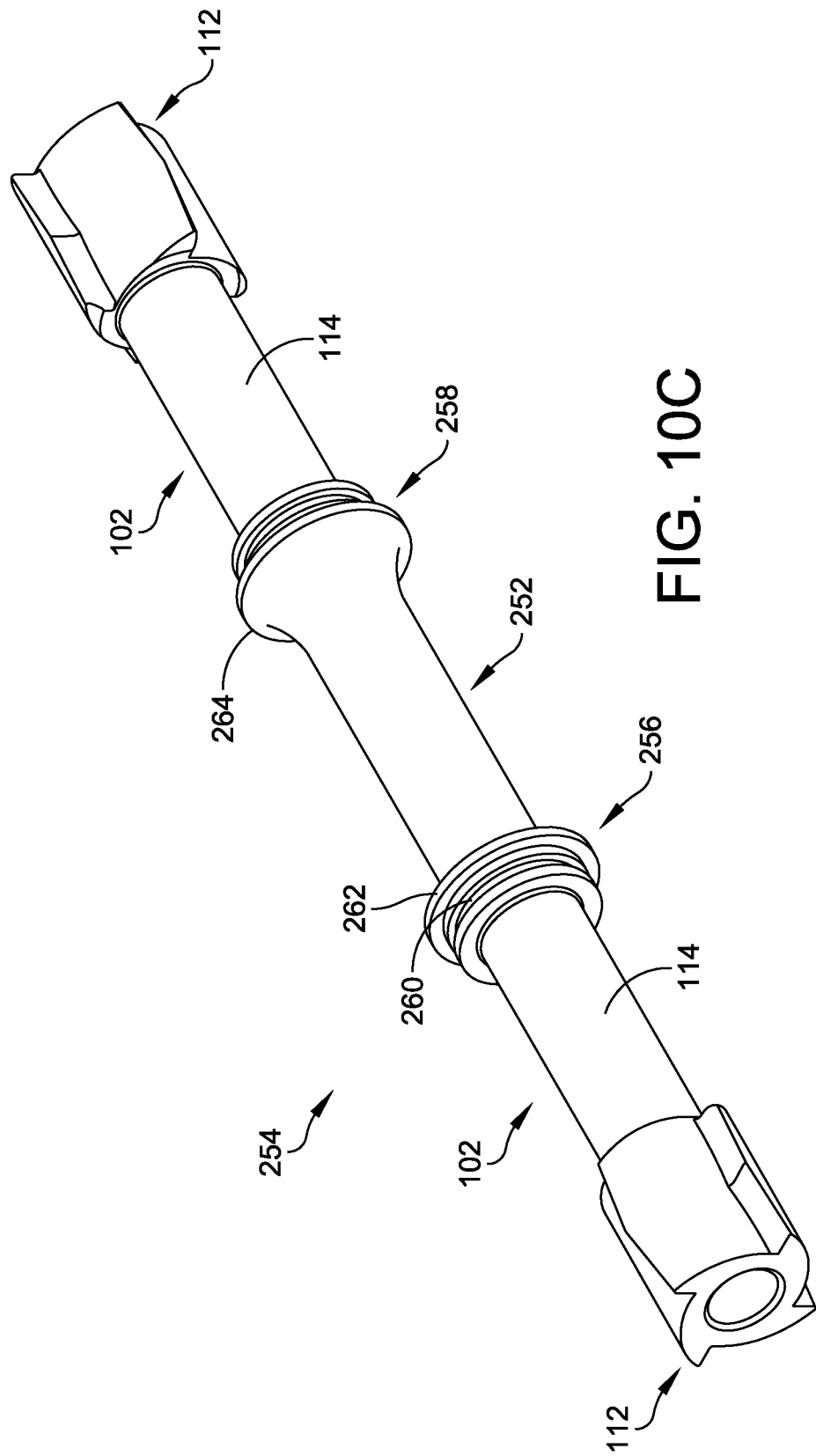

350

```
Operably couple a single universal joint (U-joint)
assembly between a drive component (e.g., a
mud motor rotor) and a driven component (e.g.,
a mud motor output shaft)
352
```

```
Position the universal joint (U-joint) assembly at
an angled or articulating joint (e.g., a bend in a
mud motor housing)
354
```

```
Articulate the male U-joint member relative the
longitudinal axis, L, defined by the female U-joint
member such that the male U-joint member is
disposed at an angle relative to the longitudinal axis
356
```

```
Actuate the drive component such that a torque
is transmitted from the male U-joint member to
the female U-joint member through a contact
between select ones of the four multi-angled
surfaces positioned parallel to the angle of the
male U-joint member and adjacent ones of the
flat surfaces of the cavity of the female U-joint member
358
```

FIG. 13

TRANSMISSION ASSEMBLY FOR TRANSMITTING TORQUE ACROSS AN ANGULAR CONNECTION BETWEEN A TORSIONAL DRIVE COMPONENT AND A TORSIONALLY DRIVEN COMPONENT

REFERENCE TO PENDING PRIOR PATENT APPLICATION

This application is a divisional of U.S. patent application Ser. No. 16/384,389, filed Apr. 15, 2019, which is now U.S. Pat. No. 11,137,033, by Gregory Clarence Goff, Patrick Daniel Gallagher, Daniel Robert Gallagher, and Krista D. Anderson, for "DOWN-HOLE MOTOR UNIVERSAL JOINT ASSEMBLY," which is a continuation-in-part of U.S. patent application Ser. No. 16/166,819, filed Oct. 22, 2018, which is now U.S. Pat. No. 11,092,199, by Gregory Clarence Goff, Patrick Daniel Gallagher, and Daniel Robert Gallagher, for "DOWN-HOLE MOTOR UNIVERSAL JOINT ASSEMBLY," which patent application is incorporated by reference herein.

BACKGROUND

Down-hole mud motors are used to apply torque to a drill bit in oil and gas wells and other drilling applications. The mud motor is placed at a distal end of the drill string, with a drill bit connected to a distal end of an output shaft. Drilling fluid or "mud" pumped through the drill string flows through the mud motor, and the motor uses the force of the fluid to produce a mechanical output to rotate the output shaft and the drill bit.

Although there are different types of mud motors, the most commonly used type today is a positive-displacement motor which uses an elongated, helically-shaped rotor within a corresponding helically-shaped stator. The flow of drilling fluid or mud between the stator and the rotor causes the rotor to orbit within the stator eccentrically about a longitudinal axis of the stator. The rotor itself rotates about its own longitudinal axis and also orbits eccentrically around the central longitudinal axis of the stator. This eccentric orbit and rotation of the rotor must be transferred by a suitable transmission assembly to produce a concentric rotation for the output shaft.

Universal joint assemblies, commonly referred to as U-joints, are required in order to transfer the eccentric orbit and rotation of the rotor to the concentric rotation of the output shaft to drive the drill bit. To currently accomplish this, an output end of the rotor is connected to a first U-joint, and a shaft connects the first U-joint to a second U-joint. The second U-joint is, in turn, connected to a concentrically rotating output shaft.

In addition to transferring the eccentric rotation of the rotor to a concentrically rotating shaft, down-hole mud motors may require other U-joints. For example, a mud motor may be designed with a bent housing for use in directional drilling. Mud motors may also include a mechanism by which the housing may be bent at a suitable angle for a particular directional drilling effect. In either case, a U-joint may be required to traverse the bend in the housing.

Regardless of how a U-joint is used in a down-hole mud motor, such U-joints are subjected to very high torques and operate in a very hostile environment.

U.S. Pat. No. 5,267,905 to Wenzel et al. discloses one example of a prior art U-joint assembly for a down-hole mud motor. The Wenzel device and other existing U-joints include articulating joint members with a series of peripherally spaced balls on one joint member transmitting torque from one U-joint member to the other. Still other existing U-joints include articulating joint members with a series of peripherally spaced barrel rollers transmitting torque from one U-joint member to the other. The torque transmitting balls and barrel rollers provide a positive coupling between the two joint members. However, the balls and/or barrel rollers are each held within a corresponding dimple formed in one of the joint members and, therefore, must rotate with respect to the dimple surface as the joint articulates. This rubbing action between the torque transmitting ball or barrel roller and the dimple in which it is held can cause excessive wear to the ball or barrel roller and the dimple, eventually damaging the joint.

Specifically, the ball- and barrel-shaped driving elements act as a wedge as they attempt to roll out of the concave receptacles they reside in. This, in turn, generates an extreme radial force that causes distortion to the concave receptacles formed in, for example, the drive head of the male U-joint member and to the corresponding axial grooves of the receptacle of the female U-joint member that receives the male U-joint member. Such distortion creates clearance between the ball or barrel shaped drive elements and the axial grooves of the female receptacle and the concave receptacles of the drive head. As this clearance increases, vibration and torque backlash generated by the drill bit eventually increase the clearance to the point of multiple component failures, which, in turn, causes the failure of the mud motor itself due to the transmission failure.

Another problem with prior art mud-motor U-joints involves the seal structure that protects the bearing surfaces within the joint. Seals for U-joints used in mud motor applications must allow smooth articulation as the joint rotates, while protecting the internal bearing surfaces of the joint from extreme pressure, pressure variations, and high velocity drilling fluid. Should these seals fail, the joint is exposed to the hostile environment of the drilling fluid, and rapid wear and failure may occur.

Yet another problem with current drive shaft assemblies is the requisite use of two U-joint assemblies to accommodate an articulating joint, one on each end of a common shaft, which increases the chance of component failure.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a universal joint (U-joint) assembly for transmitting torque from a drive component to a driven component across an articulating joint. The U-joint assembly may include a female U-joint member coupled with the driven component, the female U-joint member defining a longitudinal axis and including a receptacle end, the receptacle end comprising: (1) a cavity extending into the receptacle end and terminating in a circular receptacle; and (2) four flat surfaces extending longitudinally from the cavity at 90-degree intervals about an inner diameter of the cavity. The U-joint assembly may also include a male U-joint member coupled with the drive component and having a drive end, the drive end comprising four multi-angled surfaces extending longitudinally from the drive end at 90-degree intervals about a periphery of the drive end.

When the drive end of the male U-joint member is received coaxially within the cavity of the female U-joint member, each of the multi-angled surfaces of the drive end of the male U-joint member opposes a corresponding one of the four flat surfaces of the female U-joint member.

Another embodiment provides a transmission assembly for transmitting torque across an angular connection between a torsional drive component and a torsionally driven component. The transmission assembly may include (1) a flexible shaft operably coupled with the torsional drive component; and (2) a single universal joint (U-joint) assembly operably coupled between the flexible shaft and the driven component, the single U-joint assembly comprising a female U-joint member defining a longitudinal axis, a central ball seat seated within the female U-joint member, and a male U-joint member axially mounted about the central ball seat and within the female U-joint member.

Yet another embodiment provides a method of transmitting a torque from a drive component to a driven component across an angled joint. The method may include the step of positioning a universal joint (U-joint) assembly at the angled joint, the U-joint assembly comprising: (1) a female U-joint member coupled with the driven component, the female U-joint member defining a longitudinal axis and including a receptacle end, the receptacle end comprising a cavity extending into the receptacle end, the cavity terminating in a circular receptacle and including four flat surfaces extending longitudinally from the cavity at 90-degree intervals about an inner diameter of the cavity; and (2) a male U-joint member coupled with the drive component and having a drive end comprising four multi-angled surfaces extending longitudinally from the drive end at 90-degree intervals about a periphery of the drive end, the drive end received coaxially within the cavity of the female U-joint member such that each of the multi-angled surfaces of the drive end of the male U-joint member opposes a corresponding one of the four flat surfaces of the cavity of the female U-joint member. The method may further include the steps of articulating the male U-joint member about the longitudinal axis such that the male U-joint member is disposed at an angle relative to the longitudinal axis that is equal to an angle of the angled joint, and actuating the drive component such that the torque is transmitted from the male U-joint member to the female U-joint member through a contact area between select ones of the four multi-angled surfaces that are positioned parallel to the angle of the male U-joint member and opposing ones of the flat surfaces of the female U-joint member.

An additional embodiment provides a U-joint assembly for transmitting torque from a drive component to a driven component across an articulating joint. The U-joint assembly may include a female U-joint member coupled with the driven component, the female U-joint member defining a longitudinal axis and including a receptacle end, the receptacle end comprising: (1) a cavity extending into the receptacle end and terminating in a circular receptacle; and (2) a plurality of longitudinal rectangular grooves extending radially outward at equal intervals from an inner diameter of the cavity, each of the longitudinal rectangular grooves bounded by three drive surfaces. The assembly may also include a male U-joint member coupled with the drive component and having a drive end, the drive end comprising a plurality of longitudinal rectangular extensions extending radially outward from a periphery of the drive end. When the drive end of the male U-joint member is received coaxially within the cavity of the female U-joint member, each of the longitudinal rectangular extensions of the drive end is received within a corresponding one of the longitudinal rectangular grooves of the cavity of the female U-joint member.

Still another embodiment provides a transmission assembly for transmitting torque across an angular connection between a torsional drive component and a torsionally driven component. The transmission assembly may include (1) a flexible shaft operably coupled with the torsional drive component; and (2) no more than one universal joint (U-joint) assembly operably coupled between the flexible shaft and the driven component, where the U-joint assembly includes a female U-joint member coupled with the torsionally driven component and defining a longitudinal axis, a central ball seat seated within the female U-joint member, and a male U-joint member coupled with the flexible shaft and axially mounted about the central ball seat and within the female U-joint member in a manner that transmits a torsional force applied by the torsional drive component upon the male U-joint member to the female U-joint member in a perpendicular direction to the longitudinal axis.

Yet another embodiment provides a method of using a universal joint (U-joint) assembly to transmit a torque from a drive component to a driven component across an articulating joint. The method may include the following steps: (1) coupling a female U-joint member with the driven component, the female U-joint member defining a longitudinal axis and including a receptacle end comprising a cavity extending into the receptacle end, the cavity having a plurality of rectangular channels extending radially outward at equal intervals from an inner diameter of the cavity, each of the rectangular channels defined by three planar drive surfaces; (2) coupling a male U-joint member with the drive component, the male U-joint member having a drive end comprising a plurality of rectangular extensions protruding radially outward at equal intervals from an outer periphery of the drive end, each of the rectangular extensions defined by a top side and opposing longitudinal sides, the top side defined by two downward angular surfaces extending axially away from either side of a top apex and each of the longitudinal sides defined by two inward angular surfaces extending axially away from either side of a side apex; (3) positioning the drive end coaxially within the cavity of the female U-joint member such that each of rectangular extensions of the drive end is received within a corresponding one of the rectangular channels of the cavity; and (4) using the drive component, articulating the male U-joint member relative to the longitudinal axis such that the male U-joint member articulates relative to the longitudinal axis, thereby causing a contact between select ones of the downward and the inward angular surfaces of the male U-joint member and opposing ones of drive surfaces of the female U-joint member to transmit the torque from the male U-joint member to the female U-joint member in directions perpendicular to the downward and the inward angular surfaces.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 1A-1D illustrate respective side-exploded, perspective-exploded, side-plan, and cross-sectional views of one embodiment of a universal joint (U-joint) assembly for transmitting torque across an articulating joint;

FIGS. 2A-2C illustrate respective perspective, side-plan, and cross-sectional views of one embodiment of a male U-joint member of the U-joint assembly of FIGS. 1A-1D;

FIGS. 3A-3D illustrate respective perspective, side-plan, and cross-sectional views of one embodiment of a female U-joint member of the U-joint assembly of FIGS. 1A-1D;

FIGS. 5A-5C illustrate respective perspective-exploded, side-exploded, and front-exploded views of one embodiment of a retaining device of the U-joint assembly of FIGS. 1A-1D;

FIGS. 6A-6B illustrate respective side-plan and cross-sectional views of one embodiment of a flexible shaft for operable connection to the U-joint assembly of FIGS. 1A-1D;

FIGS. 7A-7C illustrate respective exploded-perspective, side-plan, and cross-sectional views of one embodiment of a drive assembly incorporating the U-joint assembly of FIGS. 1A-1D coupled with the flexible shaft of FIGS. 6A-6B;

FIG. 9 illustrates a perspective view of an alternative embodiment of the retaining device of FIGS. 5A-5C;

FIGS. 10A-10B illustrate respective side-plan and cross-sectional views of one embodiment of an alternative drive assembly including two U-joint assemblies shown in FIGS. 1A-1D connected by a common cylindrical shaft;

FIG. 10C illustrates a perspective view of one embodiment of a drive sub-assembly including the drive assembly of FIGS. 10A-10B with the female U-joint members, central ball seats, and retaining devices of the U-joint assemblies removed to reveal the male U-joint members and the common cylindrical shaft of FIGS. 10A-10B;

FIG. 13 provides a flowchart depicting an exemplary method of using an embodiment of one of the drive assemblies of FIGS. 7A-7C, 10A-10C, and 11A-11B to transmit torque across an articulating or angled joint;

DETAILED DESCRIPTION

Figure 1A:
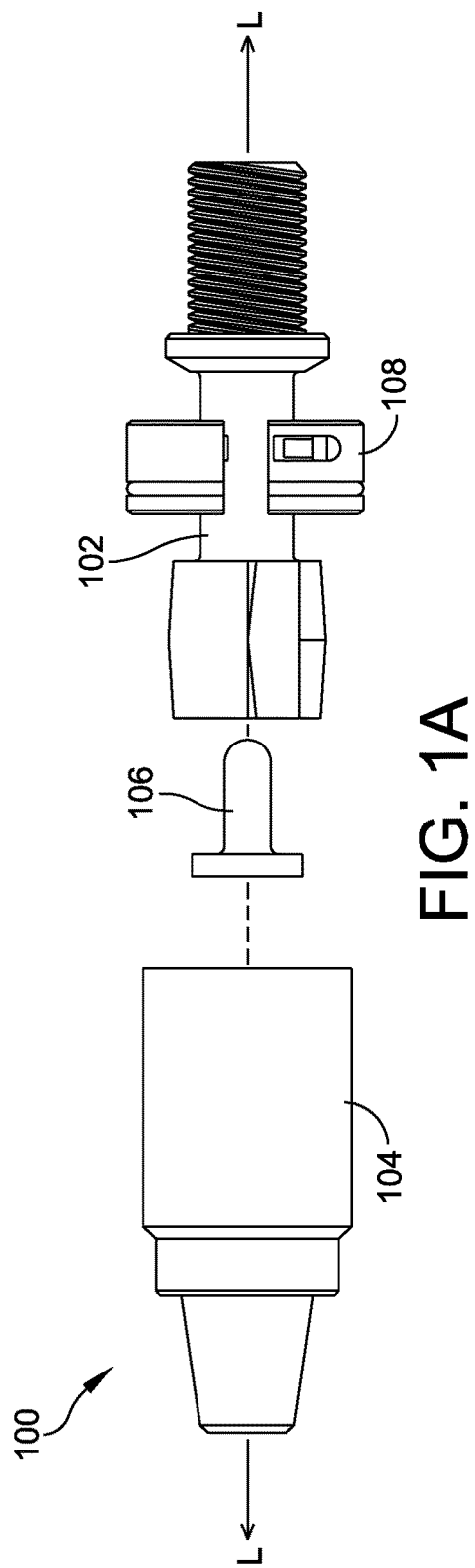
Figure 1B:
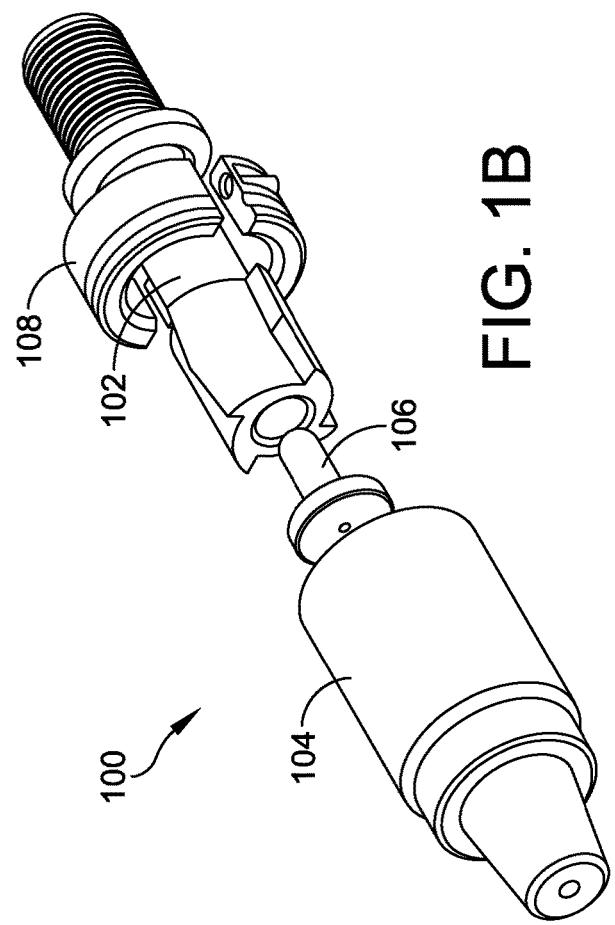
Figure 3D:
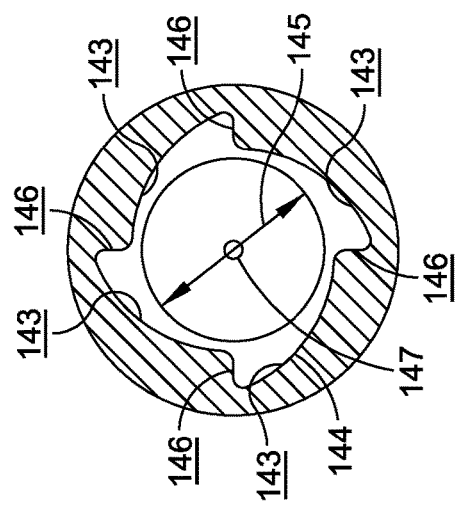
Figure 4A:
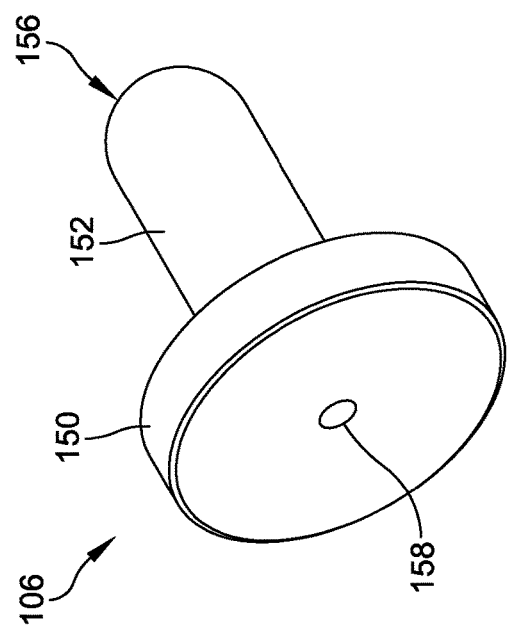
FIGS. 4A-4D illustrate respective perspective, top-plan, side-plan, and cross-sectional views of one embodiment of a central ball seat of the U-joint assembly of FIGS. 1A-1D.
Figure 4B:
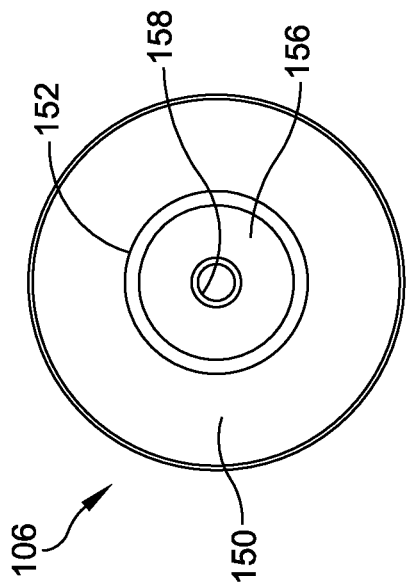
Figure 4C:
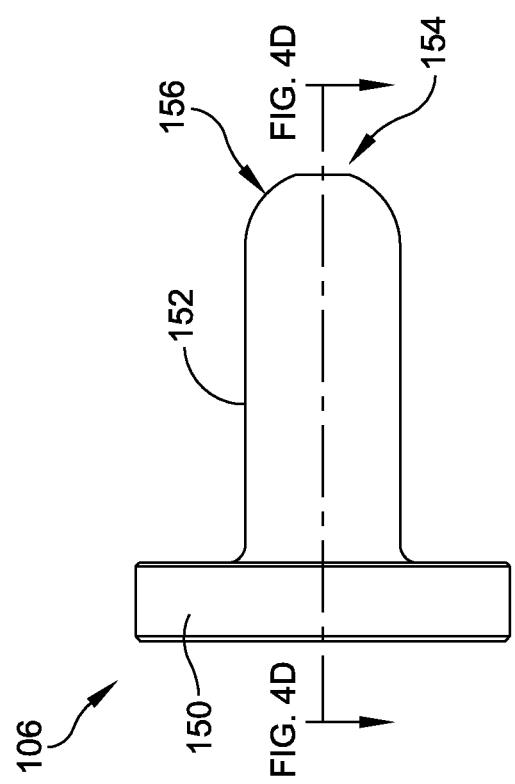

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to universal joint assemblies, or U-joint assemblies, for transferring torque in a variety of drilling environments involving a down-hole mud motor including, for example, transferring torque between an eccentrically rotating rotor and a concentrically rotating output shaft of a mud motor to drive a drill bit or in traversing a bend in a housing of a mud motor. More specifically, this description discusses embodiments of a U-joint assembly that transmits torque across the articulating joint assembly, or between U-joint members, by maintaining a near constant face-to-face contact between a male U-joint member and a female U-joint member as the joint articulates.

Embodiments of the disclosed U-joint assembly and associated drive assemblies may be operated in any drilling environment with minimal wear or damage to the components due to a minimal number of components required to form the assemblies, the primary material used to manufacture the assembly components, and the ability for the U-joint assembly and drive assemblies to be operated in either a sealed and lubricated environment or, should a loss of sealing and lubrication occur, operated with only drilling fluid as a lubricating fluid.

Turning to the exemplary embodiments, FIGS. 1A-1D illustrate respective perspective-exploded, side-exploded, side-plan, and cross-sectional views of one embodiment of a U-joint assembly 100 for transmitting torque across an angled or articulating joint. In this embodiment, the U-joint assembly 100 may include a female U-joint member 104 defining a longitudinal axis L, as well as a male U-joint member 102, a central ball seat 106, and a retaining device 108, all coaxially mounted along the longitudinal axis, L.

FIGS. 2A-2C illustrate respective perspective, side-plan, and cross-sectional views of one embodiment of the male U-joint member 102. In this embodiment, the male U-joint member 102 may include a male-threaded end 110 separated from an opposing drive end 112 by a smaller diameter shaft 114 extending therebetween. The male-threaded end 110 may form a male threaded connection 116 configured to be threadably engaged directly or indirectly with an appropriate drive component such as, for example, a rotor of a mud motor or a drive shaft coupled with the rotor of the mud motor, as discussed below.

The drive end 112 may include four multi-angled faces 118, each situated longitudinally at a 90-degree interval about an outer circumference or periphery of the drive end 112. Each of the multi-angled faces may feature a crown 126 located at an apex of a first angled surface 128 and a second angled surface 130 where each of the first and the second angled surfaces 128, 130 angle away from the crown 126. Four convex radiused surfaces 120 may correspond to the four multi-angled faces 118, each traversing between a crest 122 of each one of the multi-angled faces 118 to a root 124 of the adjacent multi-angled face 118. As shown in FIG. 2C, the drive end 112 may also include a conical end cavity 132 that extends from a circular opening 134 within the drive end 112 to a concave, semi-spherical bearing surface 136 at its termination.

FIGS. 3A-3D illustrate respective perspective, side-plan, longitudinal cross-sectional, and end cross-sectional views of one embodiment of the female U-Joint member 104. In this embodiment, the female U-joint member 104 may include a male threaded end 138 and an opposing receptacle end 140. The male threaded end 138 may form a male threaded connection configured to engage directly or indirectly with an appropriate driven component, such as, for example, a radial bearing or an output shaft of a mud motor, as discussed further below.

The receptacle end 140 may include a female threaded connection 142 and a cavity 144 extending away from the female threaded connection 142. In this embodiment, the cavity 144 may include four flat surfaces 146 extending longitudinally from the cavity 144 at 90-degree intervals about an inner diameter 145 of the cavity 144. Four concave radiused surfaces 143 may arc between each of the flat surfaces 146 and may align with or oppose the radiused surfaces 120 of the male U-joint member 102 when the drive end 112 of the male U-joint member 102 is inserted coaxially into the receptacle end 140 of the female U-joint member 104. The cavity 144 may terminate in a circular receptacle 148 located at the bottom of the cavity 144. A threaded lubrication channel 147 may extend longitudinally from an end of the male threaded end 138 to the circular receptacle 148.

FIGS. 4A-4D illustrate perspective, top-plan, side-plan, and cross-sectional views of one embodiment of the central ball seat 106, respectively. In this embodiment, the central ball seat 106 may include a flat circular base 150 having a centrally located shaft 152 that extends proximally-to-distally therefrom. In an assembled configuration, a distal end 154 of the shaft 152 may terminate in a convex semi-spherical bearing surface 156 configured to impinge upon the concave semi-spherical bearing surface 136 of the conical end cavity 132 of the male U-joint member 102, discussed above. A grease passage 158 may be formed axially through the shaft 152 and the base 150 for lubrication purposes.

Figure 5A:
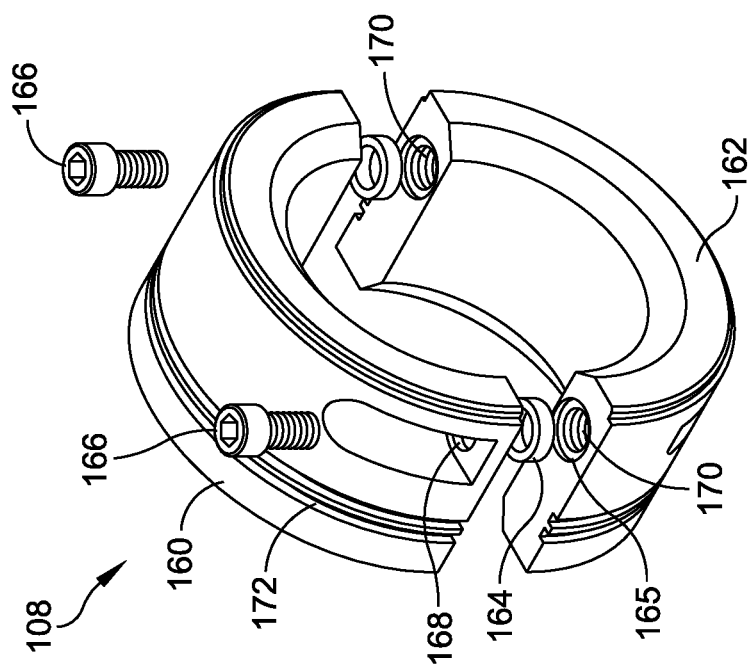
Figure 4D:
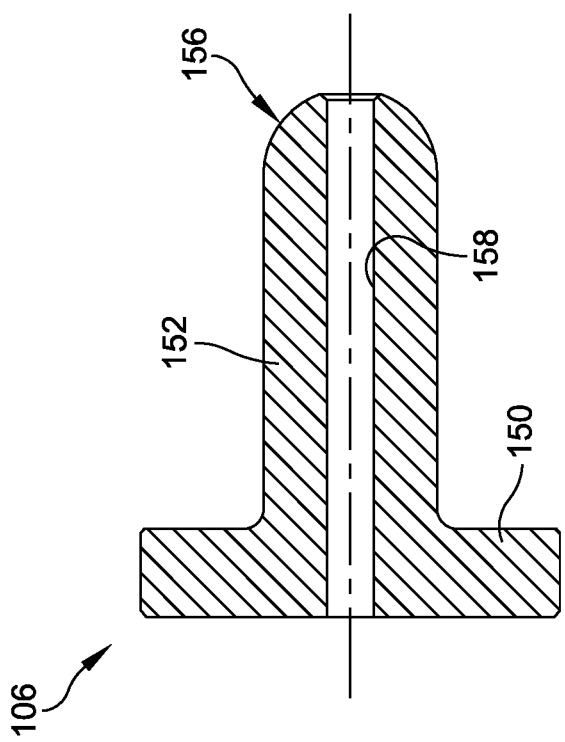

FIGS. 5A-5C illustrate respective perspective-exploded, side-exploded, and front-exploded views of one embodiment of the retaining device 108. In this embodiment, the retaining device 108 may include first and second semi-circular segments 160, 162 configured to clamp about the shaft 114 of the male U-joint member. Specifically, the first and the second semi-circular segments 160, 162 may be held in alignment about the shaft 114 by two alignment sleeves 164 disposed within corresponding counterbores 165 located 180 degrees apart from one another within the second semi-circular segment 162 and two appropriate fasteners 166 (e.g., socket head fasteners). The fasteners 166 may secure the first and the second semi-circular segments 160, 162 by extending through a pair of alignment apertures 168 formed within the first semi-circular segment 160, through the alignment sleeves 164 disposed within the counterbores 165, and into a corresponding pair of threaded apertures 170 formed in the second semi-circular segment 162, as shown in FIGS. 5A-5B. In one embodiment, the assembled retaining device 108, formed from the assembled first and second semi-circular segments 160, 162, may also include a circumferential threading 172 about its circumference. The circumferential threading 172 may be threadably coupled with the female threaded connection 142 of the female U-joint member 104.

Returning to FIGS. 1C-1D illustrating the assembled configuration of the U-joint assembly 100, the retaining device 108 may be secured about the smaller diameter shaft 114 of the male U-joint member 102 using the fasteners 166. In this regard, the retaining device 108 may be sized to provide an articulation offset, O, between the shaft 114 and the retaining device 108 when the retaining device 108 is secured about the shaft 114. This articulation offset, O, provides sufficient space for radial movement of the shaft 114 within the retaining device 108 when the drive end 112 of the male U-joint member articulates within the cavity 144 of the female U-joint member 104.

The circular flat base 150 of the central ball seat 106 may be received within the circular receptacle 148 located at the bottom of the receptacle cavity 144 of the female U-joint member 104. In turn, the drive end 112 of the male U-joint member 102 may be inserted into the receptacle cavity 144 of the receptacle end 140 of the female U-joint member 104, thereby causing the convex semi-spherical bearing surface 156 of the shaft 152 of the central ball seat 106 to be received by the concave semi-spherical bearing surface 136 of the conical end cavity 132 of the male U-joint member 102, such that the male and the female U-joint members 102, 104 may rotate and/or articulate about the longitudinal axis, L, with the bearing surfaces 136, 156 impinging upon each other. The circumferential threading 172 of the retaining device 108 may be threaded into the female threaded connection 142 of the female U-joint member 104 to secure the female U-joint member 104 about the central ball seat 106 and the drive end 112 of the male U-joint member 102.

In one embodiment, a single U-joint assembly 100, as shown and discussed in relations to FIGS. 1-5 above, may be used in connection with a flex shaft 180, shown in FIGS. 6A-6B. Embodiments of the flex shaft 180 may feature opposing first and second ends 182, 184 separated by a flexible shaft 185 disposed therebetween. The first end 182 of the flex shaft 180 may form a female threaded connection 186, and the second end 184 of the flex shaft 180 may form a male threaded connection 188.

Figure 7C:
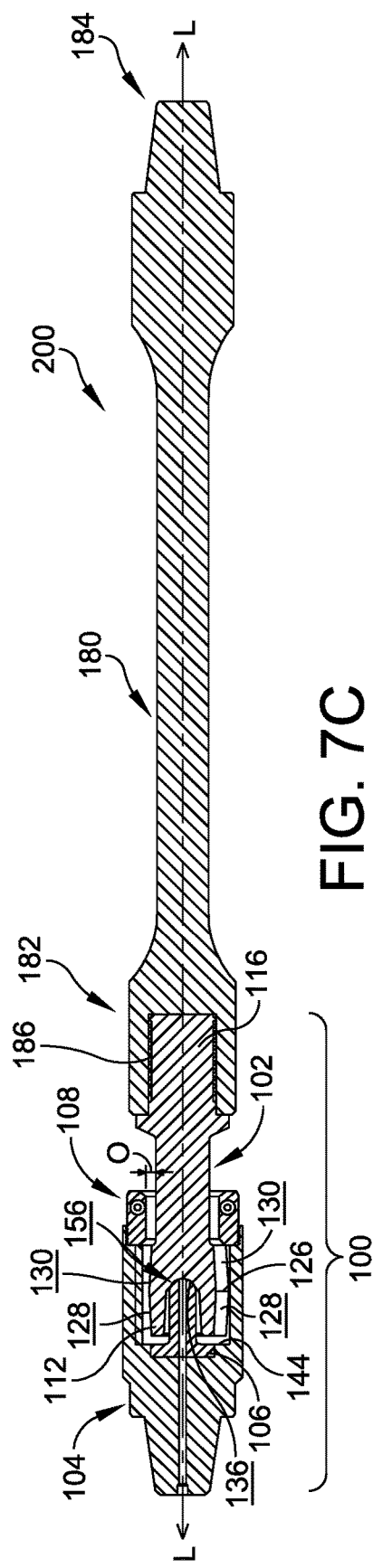

FIGS. 7A-7C illustrate respective perspective-exploded, side-plan, and cross-sectional views of a drive assembly 200 including a single U-joint assembly 100 assembled to and used in concert with an embodiment of the flex shaft 180. As assembled, the male threaded connection 116 of the male-threaded end 110 of the male U-joint 102 may be threaded into the female threaded connection 186 of the flex shaft 180. The U-joint assembly 100, and particularly the assembled drive assembly 200, transmits torque between the male U-joint member 102 and the female U-joint member 104 through an interfacing of the angled and radiused surfaces spaced about the periphery of the drive end 112 of the male U-joint member 102 and about the inner diameter 145 of the cavity 144 of the receptacle end 140 of the female U-joint member 104.

Specifically, and as shown in FIG. 7C, as the drive end 112 of the male U-joint member 102 articulates within the cavity 144 of the female U-joint member 104 relative to (e.g., in a direction orthogonal to) the longitudinal axis, L, the first angled surface 128 of the drive end 112 positioned parallel to an articulation angle of the flex shaft 180 engages the corresponding opposing flat surface 146 (FIG. 3A)

situated longitudinally about the inner diameter 145 (FIG. 3D) of the cavity 144 of the female U-shaped member 102. At the same time, the second angled surface 130 on the opposing side of the drive end 112, also positioned in parallel with the articulation angle of the flex shaft 180, simultaneously engages the corresponding opposing flat surface 146 situated longitudinally about the inner diameter 145 of the cavity 144 of the female U-shaped member 102. The crowns 126 positioned orthogonal to the engaged multi-angled surfaces 118—or the crowns 126 between the first and the second angled surfaces 128, 130 of the multi-angled surfaces 118 offset 90 degrees from the engaged first and second angled surfaces 128, 130—may engage the corresponding opposing flat surfaces 146.

As the angle of the flex shaft 180 increases, an area of contact between the respective angled surfaces 128, 130 of the male U-joint member 102 and the flat surfaces 146 of the female U-joint member 104 correspondingly increases, thereby transmitting torque from the male U-joint member 102 to the female U-joint member 104. The angled surfaces 128, 130 of the male U-joint member 102 and the flat surfaces 146 of the female U-joint member 104 may be configured such that the U-joint assembly 100 distributes the applied or driving torsional force over a combined surface area of at least 14 square inches, which spreads the force over a substantial flat surface and dramatically reduces wear on the joint and increases a life of the joint before failure.

The radiused surfaces 120 corresponding to each of the four multi-angled surfaces 118 of the drive end 112 of the male U-joint member 102 (FIGS. 2A-2B), each traversing between the crest 122 of each one of the multi-angled faces 118 to the root 124 of the adjacent multi-angled face 118, provide substantial resistance to shearing from high-torque power sections. Moreover, the central ball seat 106 facilitates smooth articulation with minimal wear, while the convex semi-spherical bearing surface 156 of the ball seat 106, which is seated within the concave semi-spherical bearing surface 136 of the male U-joint member 102, acts as a thrust bearing between the male and the female U-joint members 102, 104 to support significant axial loading.

In this embodiment of the drive assembly 200 incorporating the flex shaft 180, and due to the articulating nature of the U-joint assembly 100 and the flexible nature of the flex shaft 180, a single U-joint assembly 100 accomplishes what has previously required two U-joint assemblies in existing designs, thereby saving money in both inventory, assembly time, and repair time required.

Figure 8:
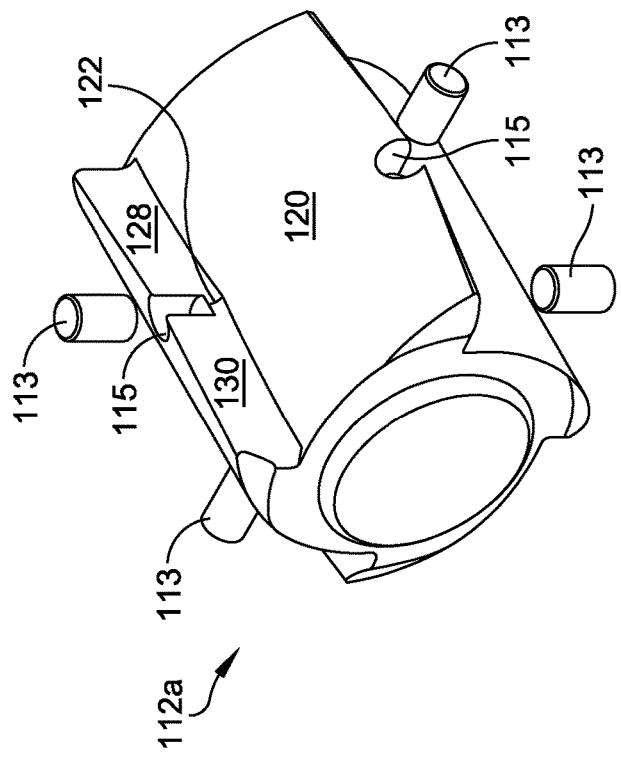
FIG. 8 illustrates a perspective view of an alternative embodiment of a drive end of the male U-joint member of FIGS. 2A-2C.

FIG. 8 provides a perspective view of an alternative embodiment of a drive end 112*a* of the male U-joint member 102. In this embodiment, the drive end 112*a* includes features identical to the drive end 112 of FIGS. 2A-2C, but contains a provision for the installation of a hardened roller or cylindrical bearing 113 within a cylindrical pocket 115 located on the crown 122 between each of the first and the second angled surfaces 128, 130. The addition of the cylindrical bearing 113 serves to reduce frictional wear between the crowns 122 and the flat surfaces 146 of the female U-joint member 104 during operation.

Figure 14:
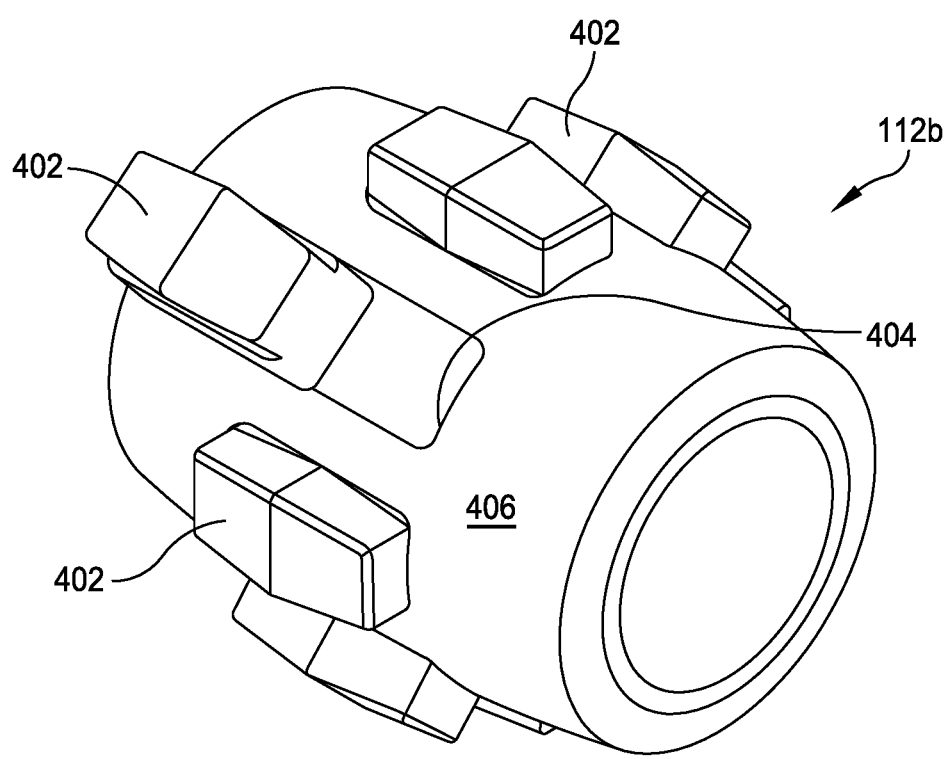
FIG. 14 illustrates a perspective view of an alternative embodiment of a drive end of the male U-joint member of the U-joint assembly of FIGS. 1A-1D.
Figure 15A:
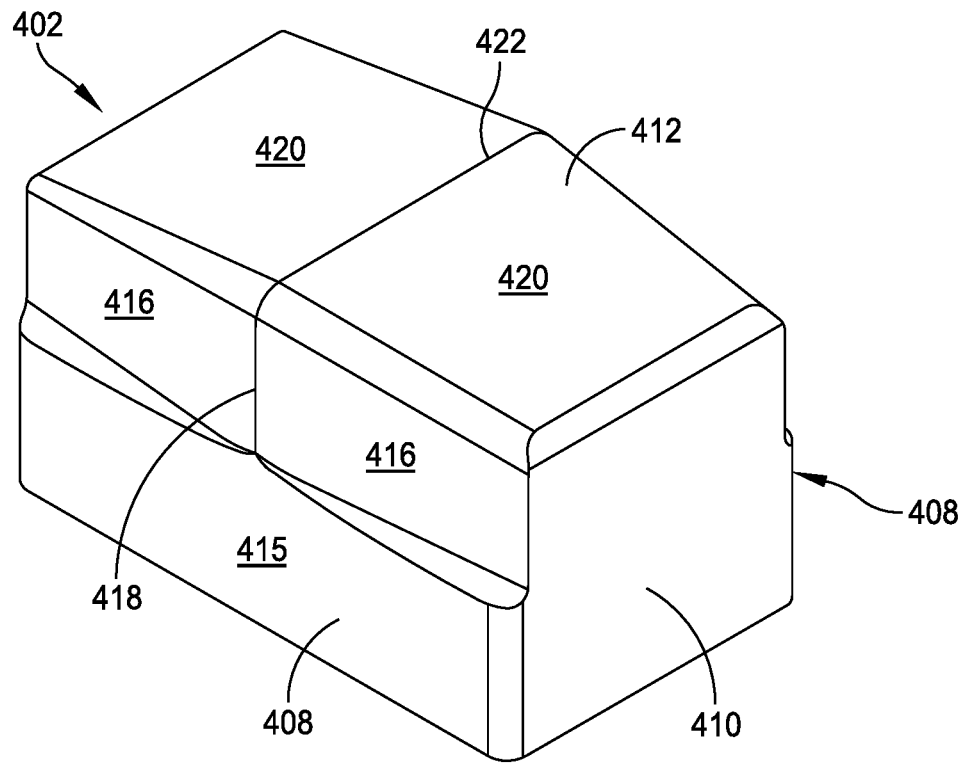
FIGS. 15A-15D illustrate respective perspective, longitudinal side, end, and bottom views of one embodiment of a rectangular-shaped machined insert of the drive end of FIG. 14.
Figure 15B:
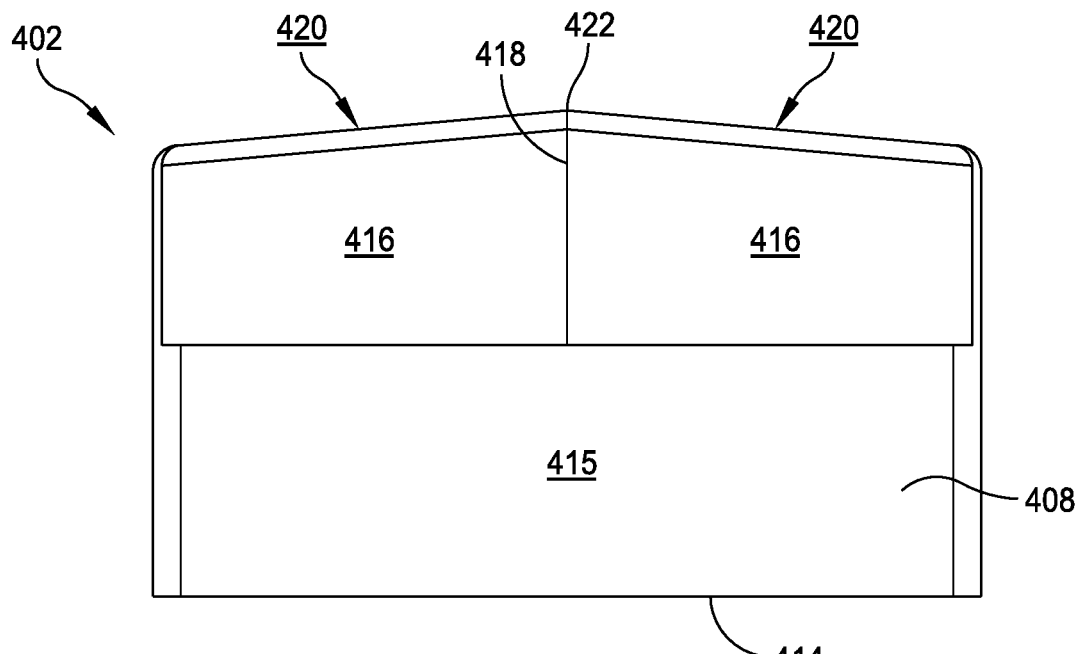
Figure 15C:
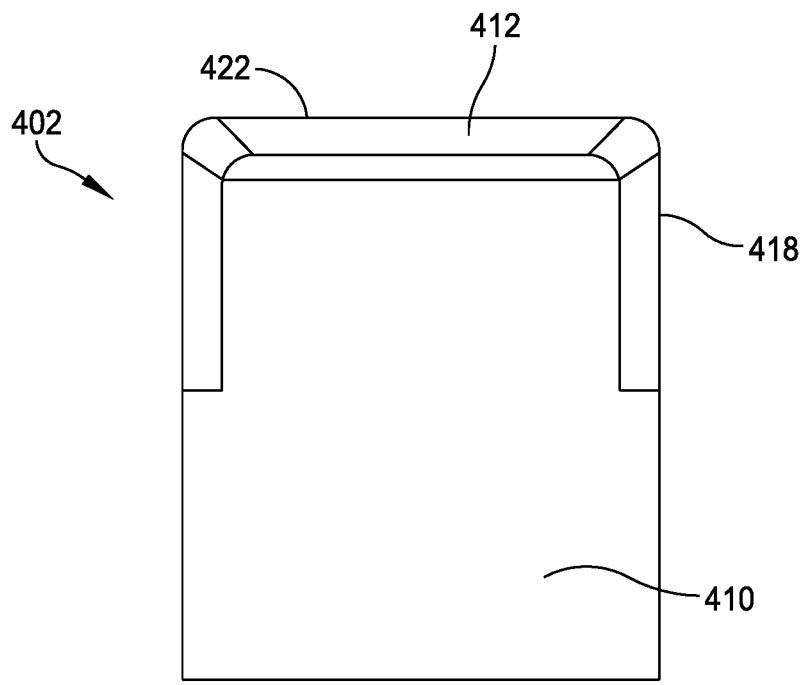
Figure 15D:

FIG. 14 illustrates a perspective view of another alternative embodiment of a drive end 112*b* of the male U-joint member 102. In this embodiment, the drive end 112*b* may include a plurality of rectangular-shaped extensions that protrude radially outward from the drive end 112*b*. In one embodiment, the extensions may take the form of a plurality of machined, rectangular-shaped inserts 402, each situated longitudinally at equal intervals about and extending radially outward from an outer circumference or periphery of the drive end 112*b*. The rectangular-shaped inserts 402 may each be received within and retained by a corresponding receptacle 404 formed in an outer radial surface 406 of the drive end 112*b*. In other embodiments, the rectangular-shaped extensions may take any appropriate size, shape, type, and/or configuration. For example, in one embodiment, they may be incorporated directly into the drive end 112*b* as manufactured protrusions.

FIGS. 15A-15D illustrate respective perspective, longitudinal side, end, and bottom views of one embodiment of the rectangular-shaped insert 402 of the drive end 112*b* of the male U-joint member 102. In this embodiment, the rectangular-shaped insert 402 may have a generally rectangular profile formed from two opposing longitudinal sides 408 (i.e., identical left and right sides), two opposing ends 410, a top side 412, and a bottom side 414. Each of the opposing left and right sides 408 may include a planar lower surface 415 and two upper angular surfaces 416 extending axially from a side apex or crest 418 inward toward a center of the insert 402. Similarly, the top side 412 may include two angular surfaces 420 extending axially from a top crest 422 downward toward the center of the insert 402. In one embodiment, each of the side and top angular surfaces 416 and 420 may be angled away from the side and top crests 418 and 422, respectively, by an angle between 1.5 and 5 degrees.

The bottom side 414 and the planar lower surfaces 415 of the opposing left and right sides 408 of the insert 402 may be received and retained within the corresponding receptacle 404, such that the angular surfaces 416 and 420 of the opposing left and right sides 408 and the top side 412, respectively, protrude outward from the receptacle 404, as shown in FIG. 14. The inserts 402 may be retained within the receptacles 404 in any appropriate manner including, for example, an interference fit.

Figure 16A:
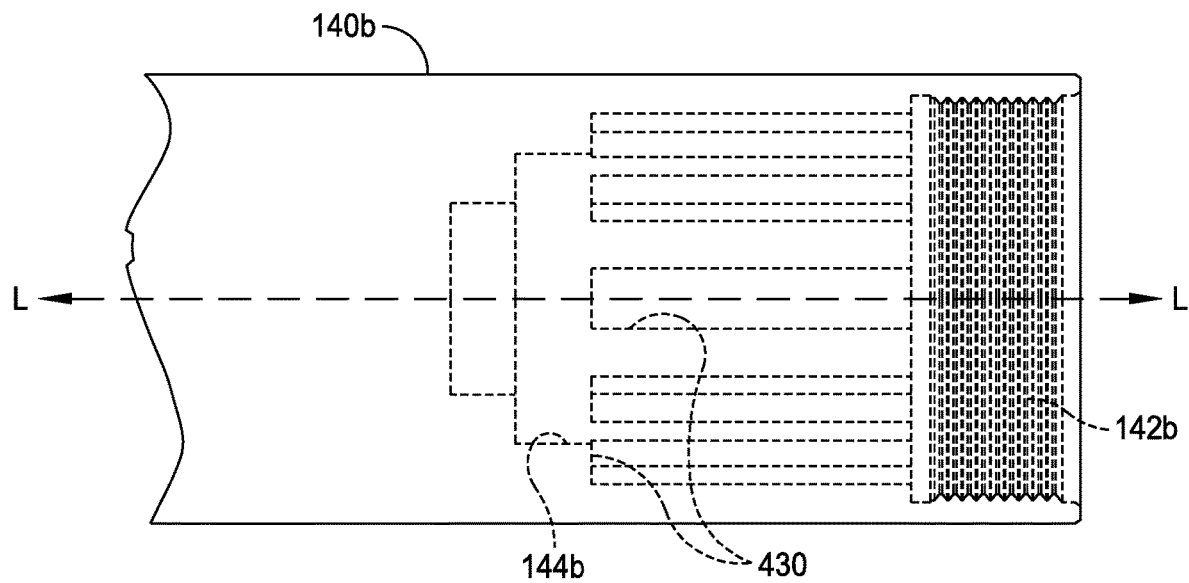
FIGS. 16A-16B illustrate respective side-plan and cross-sectional views of an alternative embodiment of a receptacle end the female U-joint member of FIGS. 1A-1D.
Figure 16B:
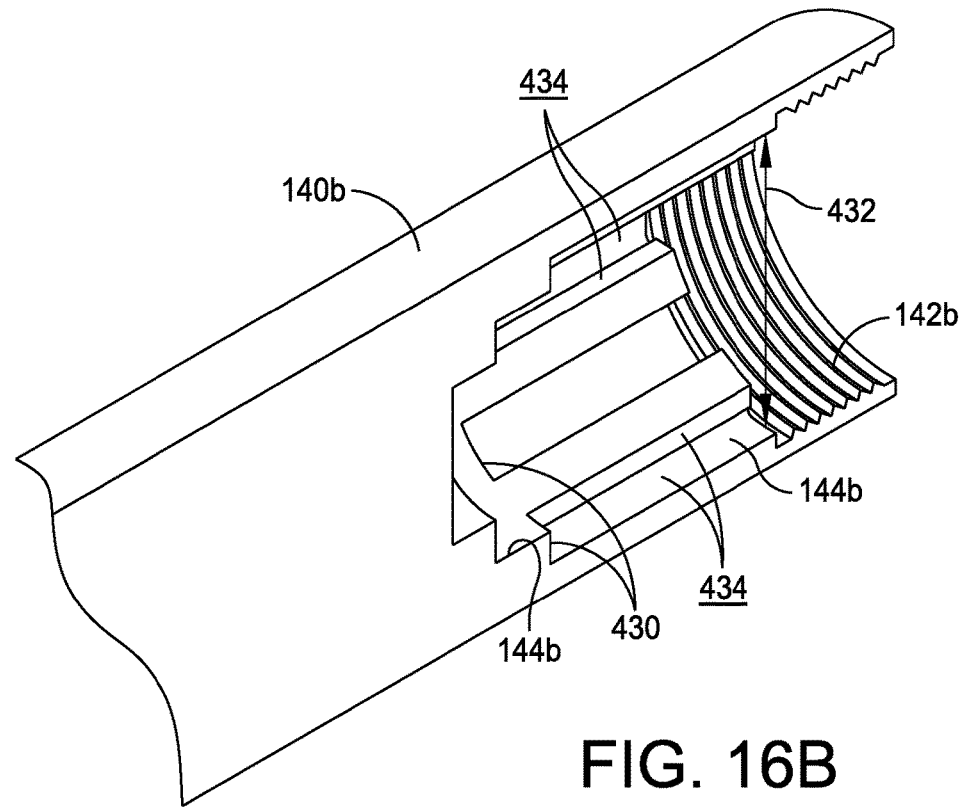

FIGS. 16A-16B illustrate respective side-plan and cross-sectional views of another embodiment of a receptacle end 140*b* the female U-joint member 104. In one embodiment, the receptacle end 140*b* may define the longitudinal axis, L, and be configured to coaxially receive the drive end 112*b* of the male U-joint member 102, discussed above in relation to FIGS. 14 and 15A-15D.

In this embodiment, the receptacle end 140*b* may include a similar configuration to the receptacle end 140, discussed above in relation to FIGS. 3A-3D, but may include a female threaded connection 142*b* and a cavity 144*b* extending inward from the threaded connection 142*b*. The receptacle cavity 144*b* may include a plurality of rectangular channels or grooves 430 situated radially at equal intervals about an inner diameter 432 of the cavity 144*b* in a pattern that mirrors the pattern of the rectangular-shaped inserts 402 of the drive end 112*b* of the male U-joint member 102, discussed above, where each of the rectangular channels or grooves 430 extends radially outward from an inner diameter 432 of the cavity 144*b* and is defined by three planar drive surfaces 434.

Figure 17A:
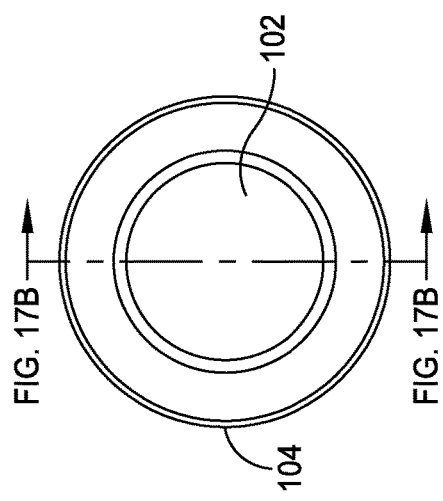
FIGS. 17A-17B illustrate respective end and cross-sectional views of an assembly including the male U-joint member drive end of FIG. 14 coaxially received within the female U-joint member receptacle end of FIGS. 16-16B.
Figure 17B:
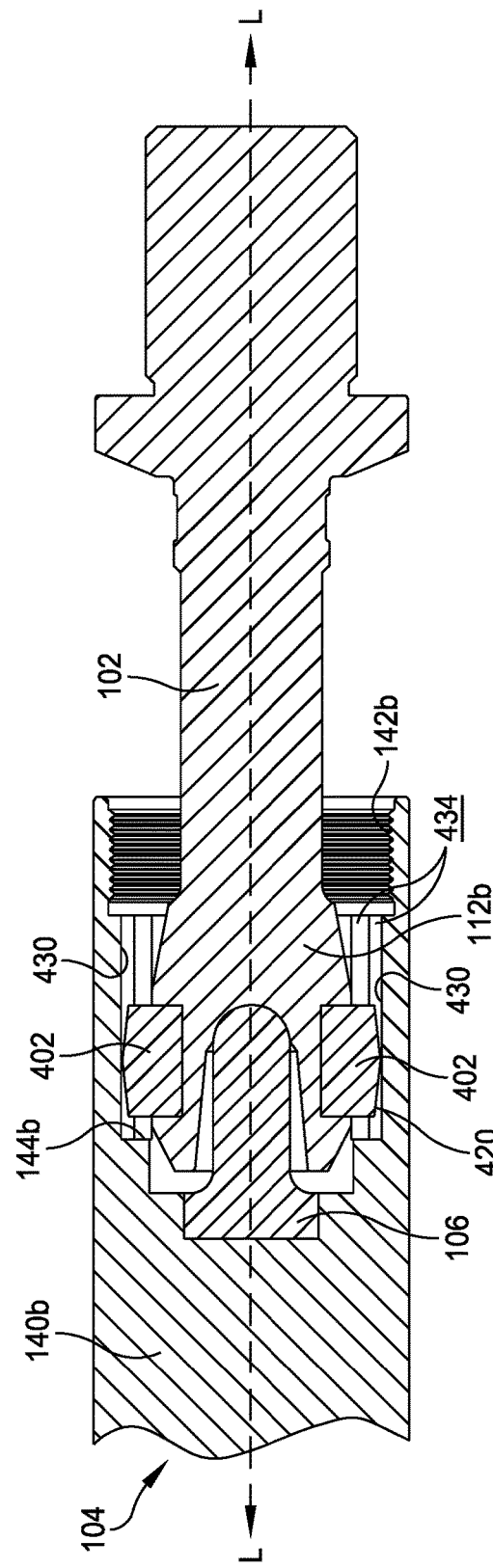

In this embodiment, when the drive end 112*b* of the male U-joint member 102 is received coaxially within the receptacle cavity 144*b* of the female U-joint member 104, as shown in FIGS. 17A-17B, the rectangular inserts 402 protruding from the drive end 112*b* are received within aligned ones of the rectangular channel/grooves 430 such that the angular surfaces 416 and 420 of the inserts 402 oppose corresponding ones of the drives surfaces 434 of the rectangular grooves 430.

Under normal drilling operations, eccentric radial movement of the rotor within the stator and/or the angular bend of either a fixed bend or an adjustable angle housing causes the drive end 112b of the male U-joint member 102 to move at various articulation angles about the pivot of the central ball seat 106, relative to the longitudinal axis, L, defined by the female U-joint member 140b. This articulation relative to the longitudinal axis, L, causes select ones of the angular surfaces 416, 420 to come into contact with the corresponding opposing drive surfaces 434 of the rectangular grooves 430 formed in the female receptacle end 140b. This contact between the respective side and top angular surfaces 416 and 420 of the inserts 402 and the opposing drive surfaces 434 of the rectangular grooves 430 allows the resulting force of the torque applied to the drive head 112b to be transmitted across a contact area between the angular surfaces 416, 420 and the opposing drive surfaces 434 in a direction that is perpendicular to the angular surfaces 416 and 420, thereby transmitting the torsional forces from the drive head 112b of the male U-joint member to the receptacle end 140b of the female U-joint member in a manner that eliminates the wedge effect that prior art balls and barrel rollers create in operation.

The drive end 112b differs from the prior art ball and barrel rollers in that the assembled U-joint components may be operated in any drilling environment with minimal wear or damage to the components. In addition, the mated drive end 112b of the male U-joint member 102 and the receptacle end 140b of the female U-joint member 104 may either be operated in a sealed, lubricated environment or, should the loss of sealing and lubrication occur, the assembly may function as designed with only drilling fluid as a lubricating fluid. As discussed above, current ball-and-groove or barrel roller-and-groove arrangements have minimal points of contact between the driving and driven components, which concentrates the applied torque to such a small area that the material yields immediately causing surface deformation, which leads to rapid wear and failure.

FIG. 9 provides a perspective view of an alternative embodiment of a retaining device 108a used in assembling the U-joint assembly 100. In this embodiment, the retaining device 108a includes features identical to the retaining device 108 detailed in FIGS. 5A-5C, but includes a retaining shoulder 109, which provides a leverage surface for the installation of a sealing boot or other gasket (not shown).

FIGS. 10A-10B illustrate side and cross-sectional views of one embodiment of an alternative drive assembly 250. In this embodiment, the drive assembly 250 may include two U-joint assemblies 100 connected by a common cylindrical shaft 252 having integral provisions for a sealing boot installation. Specifically, and as shown in FIG. 10C showing a drive sub-assembly 254 comprising two of the male U-joint members 102 coupled by the common cylindrical shaft 252 extending therebetween, the shaft 252 may having opposing first and second ends 256, 258. Each of the first and the second ends 256, 258 may include an O-ring groove 260, a retaining shoulder 262, and a radiused surface 264 configured to reduce the force of the drilling fluid bearing on the drive shaft boot.

Figure 11A:
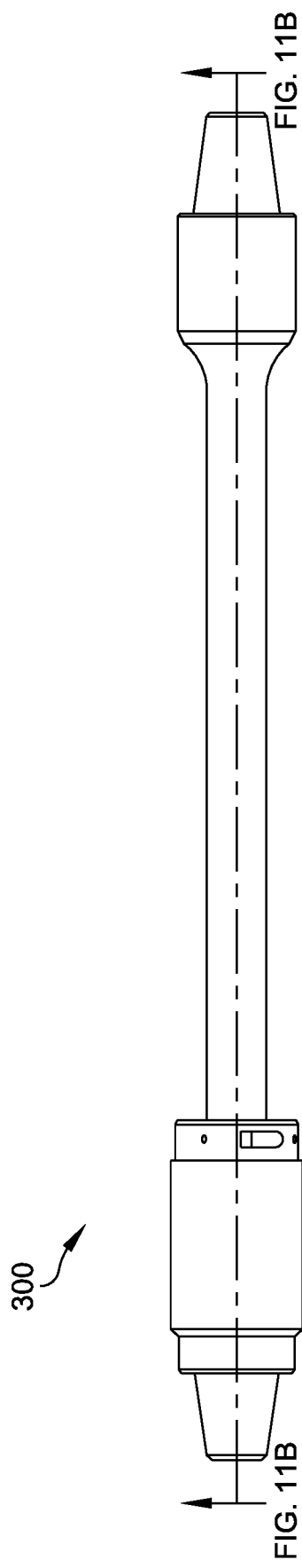
FIGS. 11A-11B illustrate respective side-plan and cross-sectional views of another alternative embodiment of a drive assembly featuring the female U-joint member of FIGS. 3A-3D, the central ball seat of FIGS. 4A-4D, the retaining device of FIGS. 5A-5C, and a flexible shaft that incorporates an embodiment of a drive end of the male U-joint member of FIGS. 2A-2C.
Figure 11B:
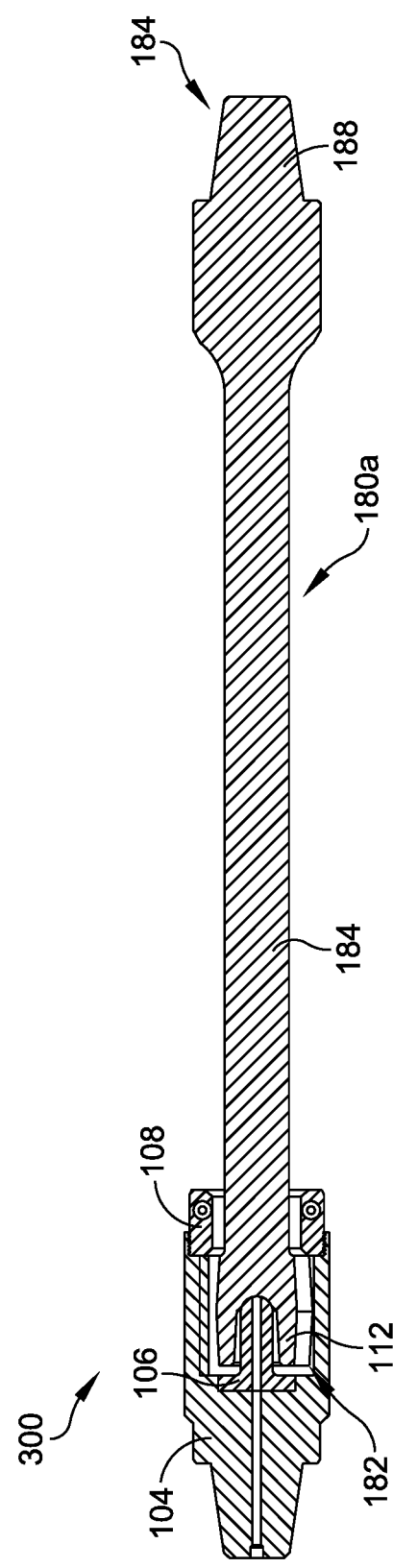

FIGS. 11A-11B illustrate side and cross-sectional views of one embodiment of an alternative drive assembly 300. In this embodiment, the drive assembly 300 may include a flex shaft 180a similar to the flex shaft 180 of FIGS. 6A-6B. Flex shaft 108a may be identical to the flex shaft 180, except rather than a female connection, the first end 182 of the flex shaft 180a may form the drive end 112 of the male U-joint member 102. As assembled, the female U-joint member 104, the central ball seat 106, and the retaining device 108 may be assembled to the drive end 112 of the flex shaft 180b in the manner discussed above in relation to FIGS. 1C-1D.

Figure 12:
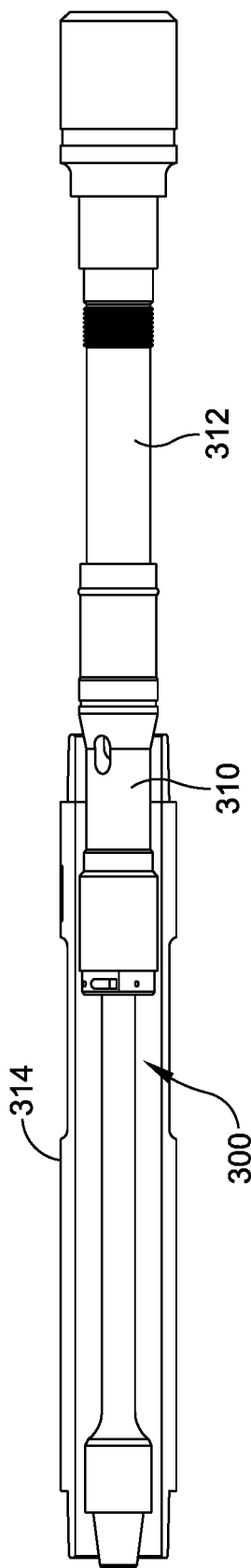
FIG. 12 illustrates a side-plan view of one embodiment of the drive assembly of FIGS. 11A-11B, as assembled to an upper male radial bearing, which is, in turn, assembled to an output shaft of a mud motor and placed within a sectional view of a fixed bend housing.

FIG. 12 illustrates a side view of the drive assembly 300 of FIGS. 11A-11B, as assembled to an upper male radial bearing 310, which is, in turn, assembled to an output shaft 312 of a mud motor and placed within a sectional view of a fixed bend housing 314.

The components forming the U-joint assembly 100 and drive assemblies 200, 250, and 300 may be formed of any appropriate material such as, for example, 17-4 stainless steel, heat treated to a PH900 condition after machining, primarily for its corrosion resistance, abrasive resistance, and torsional strength. Some embodiments may be formed of 4145HT, 4330 V MOD, and/or 4130HT steels given their abilities to harden the drive surfaces of the male and the female U-joint members. Both the male and the female U-joint members 102, 104 are repairable via welding and the resurfacing of worn areas through either machining or hand grinding.

Embodiments of the male U-joint member 102, the flexible shaft 180, 180b, and the common cylindrical shaft 252 may be either machined from billet or closed die forged to near net, with machining used to complete the features such as the cavity 144 terminating in the concave semi-spherical bearing surface 136 and the angled surfaces 128, 130 of the male U-joint member 102. As new, higher torque power sections become available, the closed die forging process may become the preferred method of manufacture for these components.

Embodiments of the U-joint assembly 100 and the drive assemblies 200, 250, 300 may be implemented in any high torque application in which the driving and driven components require an angular connection. As discussed above, exemplary operational environments include transferring torque in a variety of drilling environments involving a down-hole mud motor such as transferring torque between an eccentrically rotating rotor and a concentrically rotating output shaft of a mud motor to drive a drill bit or in traversing a bend in a housing of a mud motor.

Embodiments the disclosed U-joint assembly and drive assemblies differ from existing solutions in that the assembled components may be operated in any drilling environment with minimal wear or damage to the components due to the elegant design requiring minimal interfacing components, the manufacturing materials, and the ability to operate within or in absence of a sealed, lubricated environment. Existing U-joints and/or drive shafts utilizing ball and groove arrangements feature minimal points of contact between the driving and driven components. This configuration concentrates the applied torque on a small area and causes the material to yield immediately, resulting in surface deformation and leading to rapid wear and failure. The unique configuration of the disclosed U-joint assembly distributes the applied torsional forces through a combined surface area of 14 square inches, which spreads the force over substantial flat surfaces that minimize component wear and drastically increase component life.

FIG. 13 provides a flowchart depicting an exemplary method (350) of using embodiments of the U-joint assembly 100, incorporating an embodiment of the male and the female U-joint members disclosed herein, and drive assemblies 200, 250, 300 to transmit torque across an articulating or angled joint. In this embodiment, the method (350) may begin with operably coupling the U-joint 100 between a drive component such as a mud motor rotor and a driven component such as a mud motor output shaft (352). In one embodiment, the male U-joint member 102 may be coupled with or incorporated into the flexible rod 180, 180b. In this regard, the female U-joint member 104 may be operably coupled with the driven component, or the mud motor output shaft 312, as shown in FIG. 12, and the male U-joint member 102 may be operably coupled with the drive component, or the mud motor rotor, via the flexible shaft 180, 180b.

The U-joint assembly 100 may be positioned at an angled or articulating joint such as, for example, a bend in the mud motor housing 314 (354), and the male U-joint member may be articulated relative to or in a direction orthogonal to the longitudinal axis, L, defined by the female U-joint member 104 until the male U-joint member 102 is disposed at an articulation angle relative to the longitudinal axis, L (356). The drive component may then be actuated such that a torque is transmitted across the angled U-joint assembly, or from the male U-joint member 102 coupled with the drive component to the female U-joint member 104 coupled with the driven component (358). The transmission of torque occurs, in an example employing the drive end 112 of the male U-joint member 102 and the receptacle end 140 of the female U-joint member 104, through a contact between select ones of the first and the second angled surfaces 128, 130, which combine to form the multi-angled surfaces 118, that are positioned parallel to the articulation angle of the male U-joint member relative to the longitudinal axis, L, and opposing ones of the flat surfaces 146 of the cavity 144 of the female U-joint member 102. In another example employing the drive end 112b of the male U-joint member 102 and the receptacle end 140b of the female U-joint member 104, the transmission of torque occurs through a contact between select ones of the side and the top angular surfaces 116, 120 and opposing ones of the drive surfaces 434 of the rectangular grooves 430 formed in the receptacle cavity 144b of the female U-joint member.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A transmission assembly for transmitting torque across an angular connection between a torsional drive component and a torsionally driven component, the transmission assembly comprising:
    a flexible shaft operably coupled with the torsional drive component; and
    no more than one universal joint (U-joint) assembly operably coupled between the flexible shaft and the driven component, the U-joint assembly comprising a female U-joint member coupled with the torsionally driven component and defining a longitudinal axis, a central ball seat seated within the female U-joint member, and a male U-joint member coupled with the flexible shaft and axially mounted about the central ball seat and within the female U-joint member in a manner that transmits a torsional force applied by the torsional drive component upon the male U-joint member to the female U-joint member in a perpendicular direction to the longitudinal axis:
    wherein the female U-joint member extends from a first end to an opposing second end along the longitudinal axis, the first end operably coupled with the driven component, the second end forming a cavity terminating in a receptacle end and having a rectangular groove extending radially outward from an inner diameter of the cavity, the rectangular groove bounded by three planar drive surfaces;
    wherein the male U-joint member extends from a first end to an opposing second end, the first end of the male U-joint member coupled with the flexible shaft, the second end of the male U-joint member comprising a drive end including a longitudinal rectangular extension protruding radially outward from an outer periphery of the drive end, the drive end mounted coaxially within the cavity of the female U-joint member such that the longitudinal rectangular extension of the drive end is positioned within the rectangular groove of the cavity;
    wherein the drive end of the male U-joint member comprises a longitudinal rectangular insert having a top portion and a bottom portion, the top portion forming the longitudinal rectangular extension positioned within the rectangular groove of the cavity of the female U-joint member and the bottom portion received by and retained within a receptacle formed in an outer radial surface of the drive end; wherein the longitudinal rectangular extension comprises:
    opposing longitudinal sides, each forming a side crest disposed between a pair of angular side surfaces that extend axially from the side crest inward toward a center of the longitudinal rectangular extension; and
    a top side forming a top crest disposed between a pair of angular top surfaces that extend axially from the top crest downward toward the center of the longitudinal rectangular extension.

2. The transmission assembly of claim 1, wherein the pairs of the angular side surfaces and the pair of the angular top surfaces each oppose an adjacent one of the planar drive surfaces of the rectangular groove of the female U-joint member such that when an eccentric radial movement of the torsional drive component causes an articulation of the drive end within the cavity relative to the longitudinal axis, the angular side surfaces and the angular top surfaces contact the adjacent ones of the planar drive surfaces to transmit the torsional force from the angular side surfaces and the angular top surfaces to the adjacent ones of the planar drive surfaces.

3. The transmission assembly of claim 1, wherein:
    the angular side surfaces are angled inward relative to the side crest between 1.5 and 5 degrees; and
    the angular top surfaces are angled downward relative to the top crest between 1.5 and 5 degrees.

4. The transmission assembly of claim 1 wherein the torsional drive component is a mud motor rotor and the torsionally driven component is a mud motor output shaft.

* * * * *